(12) United States Patent
Dai et al.

(10) Patent No.: US 12,712,797 B2
(45) Date of Patent: Aug. 18, 2026

(54) METHOD AND APPARATUS FOR DETERMINING TIME OF FLIGHT

(71) Applicant: Marvell Asia Pte Ltd, Singapore (SG)

(72) Inventors: Shaoan Dai, San Jose, CA (US); Wensheng Sun, Newark, CA (US); Xing Wu, Palo Alto, CA (US); Zhenzhong Gu, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 334 days.

(21) Appl. No.: 18/382,215

(22) Filed: Oct. 20, 2023

(65) Prior Publication Data

US 2024/0137301 A1 Apr. 25, 2024
US 2024/0235976 A9 Jul. 11, 2024

Related U.S. Application Data

(60) Provisional application No. 63/417,984, filed on Oct. 20, 2022.

(51) Int. Cl.
*H04L 43/106* (2022.01)
*H04B 1/16* (2006.01)
(Continued)

(52) U.S. Cl.
CPC ............. *H04L 43/106* (2013.01); *H04B 1/16* (2013.01); *H04B 1/3822* (2013.01); *H04L 7/033* (2013.01);
(Continued)

(58) Field of Classification Search
CPC ....... H04L 43/106; H04L 41/12; H04L 12/12; H04L 7/0079; H04L 7/0091; H04L 7/033;
(Continued)

(56) References Cited

U.S. PATENT DOCUMENTS

| | | | |
|---|---|---|---|
| 7,590,077 | B2 | 9/2009 | Shida |
| 10,473,770 | B1 | 11/2019 | Zhu |
| 2017/0276469 | A1 | 9/2017 | Dai |

FOREIGN PATENT DOCUMENTS

| | | | |
|---|---|---|---|
| CN | 114839641 A | 8/2022 | |
| CN | 115442742 A | * 12/2022 | ........... H04B 1/7163 |

OTHER PUBLICATIONS

Xu et al., "A Method For Vehicle-mounted Temporary Communication Strategy Based On UWB", CN 115442742 A, Dec. 6, 2022, 7 Pages. (Year: 2022).*

(Continued)

*Primary Examiner* — Michael A Keller
*Assistant Examiner* — Chhian (Amy) Ling

(57) ABSTRACT

A first communication device receives an analog receive signal via a communication medium. An ADC of the first communication device converts the analog receive signal to a digital receive signal. Logic circuitry of the first communication device detects a plurality of timing signals from a second communication device based on analyzing the digital receive signal. The logic circuitry adjusts a sampling phase of the ADC in connection with at least some of the timing signals so that the ADC is using different sampling phases when different ones of the timing signals are detected. The logic circuitry determines timing information based on the detection of the plurality of timing signals when the ADC is using different sampling phases when different ones of the timing signals are detected. The first communication device determines a time of flight between the first communication device and the second communication device based on the timing information.

24 Claims, 10 Drawing Sheets

(51) Int. Cl.
*H04B 1/3822* (2015.01)
*H04L 7/033* (2006.01)
*H04L 7/04* (2006.01)
*H04L 12/12* (2006.01)
*H04L 41/12* (2022.01)
*H04J 3/06* (2006.01)
*H04L 7/00* (2006.01)

(52) U.S. Cl.
CPC ............ *H04L 7/0337* (2013.01); *H04L 7/044* (2013.01); *H04L 12/12* (2013.01); *H04L 41/12* (2013.01); *H04J 3/0685* (2013.01); *H04L 7/0079* (2013.01); *H04L 7/0091* (2013.01)

(58) Field of Classification Search
CPC ..... H04L 7/0337; H04L 7/044; H04B 1/3822; H04B 1/16; H04J 3/0685
See application file for complete search history.

(56) References Cited

OTHER PUBLICATIONS

Cabble, "The ABCs of UWB Technology", HID Global, Apr. 8, 2022, 3 Pages. (Year: 2022).*

Agustoni et al., "Characterization of DAC Phase Offset in IEC 61850-9-2 Calibration Systems", May 2021, IEEE Transactions on Instrumentation and Measurement, 10 Pages. (Year: 2021).*

International Search Report and Written Opinion for PCT Patent Application No. PCT/US2023/077 443, mailed Feb. 21, 2024. (12 pages).

Beruto et al., "802.3cg draft 2.0 PLCA (Clause 148) Overview," IEEE 802.3 Plenary Meeting, San Diego, CA, Jul. 9, 2018 (23 pages).

IEEE Draft P802.3cg/D3.4, "Draft Standard for Ethernet, Amendment: Physical Layer Specifications and Management Parameters for 10 Mb/s Operation and Associated Power Delivery over a Single Balanced Pair of Conductors," Institute for Electrical and Electronics Engineers (IEEE), Sep. 11, 2019 (254 pages).

Sections 147 and 148 of IEEE 802.3cg Draft Standard, available at https://www.ieee802.org/3/cg/public/Nov2017/8023cg_D0p3_T1S_revB.PDF, Nov. 2017 (30 pages).

Vozar, "OPEN Alliance 10BASE-T1S Topology Discovery, TC14—Topology Discovery," OPEN Alliance, available at https://opensig.org/download/document/OPEN_Alliance_10BASET1S_Topology_Discovery_V1.0.pdf, Mar. 21, 2023 (36 pages).

* cited by examiner

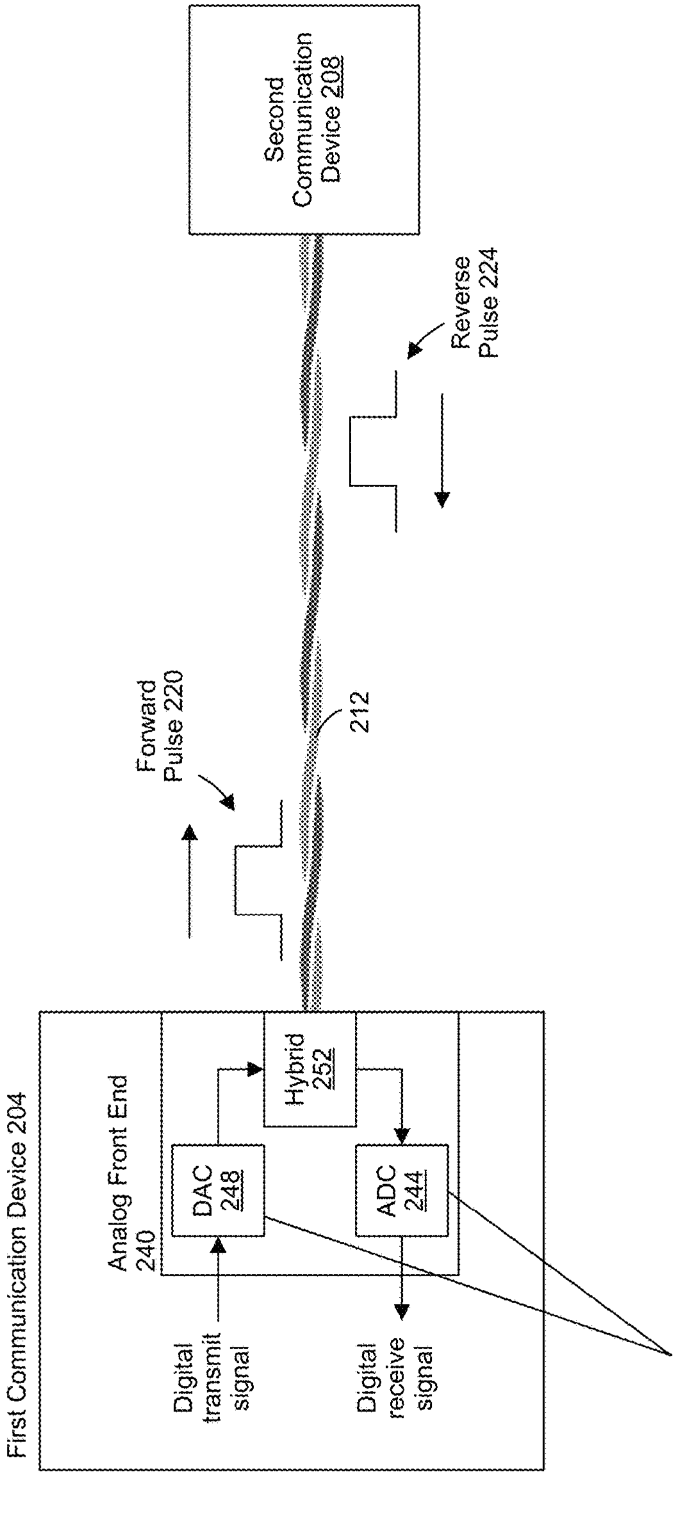
FIG. 2
200
Second Communication Device 208
Reverse Pulse 224
212
Forward Pulse 220
First Communication Device 204
Analog Front End 240
DAC 248
Hybrid 252
ADC 244
Digital transmit signal
Digital receive signal
To increase timing measurement resolution: i) ADC 244 uses different respective sampling phases in connection with receiving different ones of the reverse pulses 224, or ii) DAC 248 uses different respective clock phases in connection with transmitting different ones of the forward pulses 220

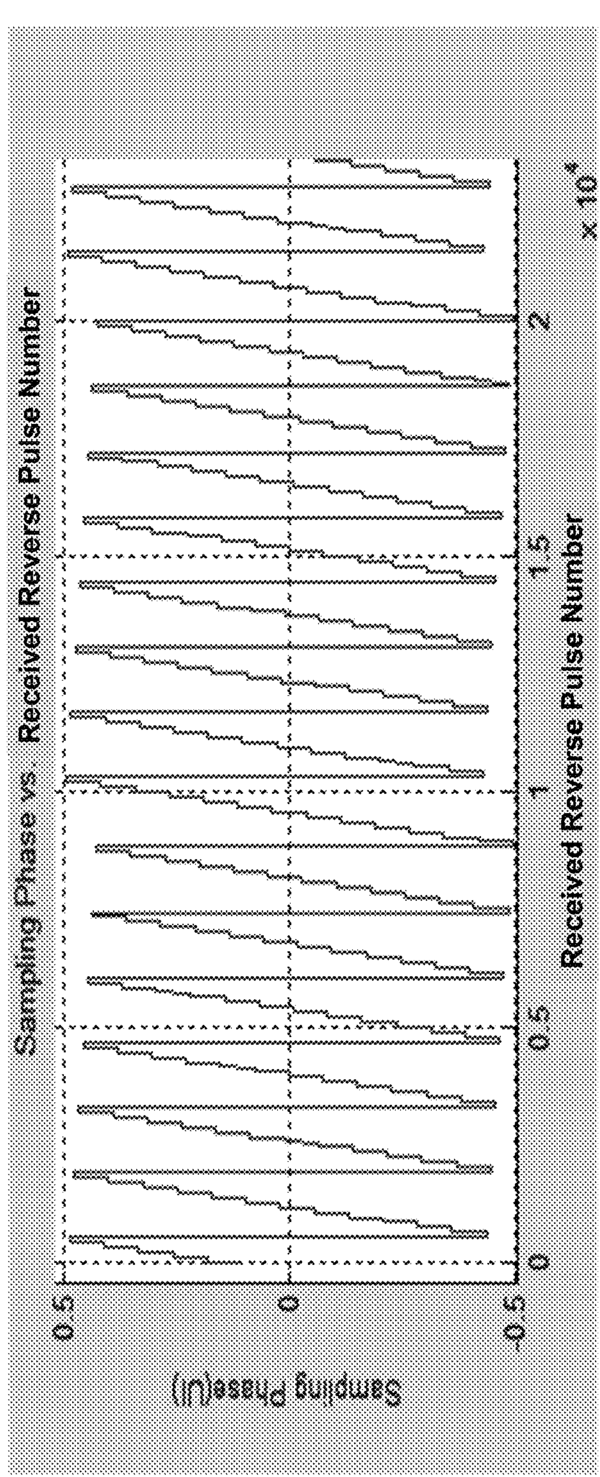
*FIG. 4*

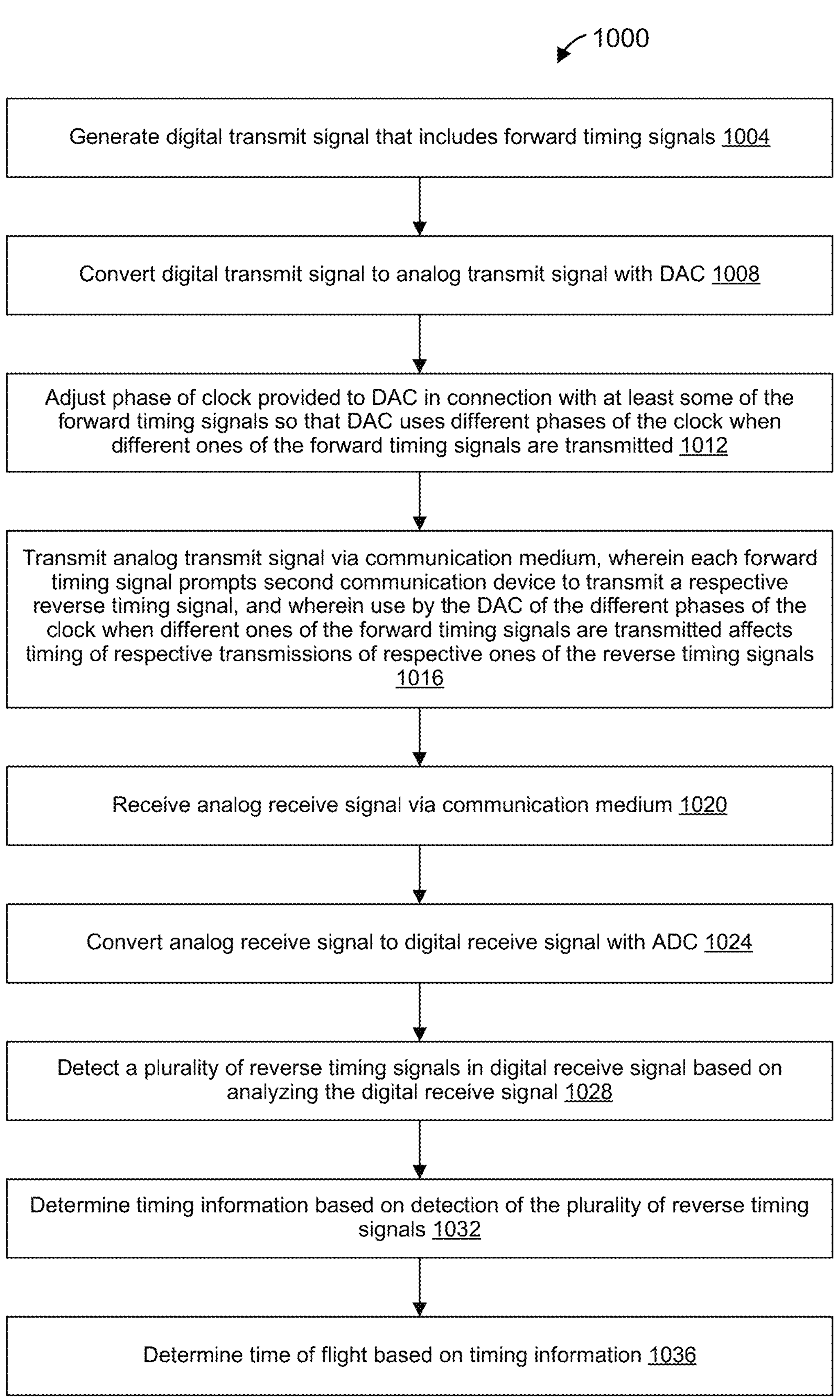
FIG. 10
1000
Generate digital transmit signal that includes forward timing signals 1004
Convert digital transmit signal to analog transmit signal with DAC 1008
Adjust phase of clock provided to DAC in connection with at least some of the forward timing signals so that DAC uses different phases of the clock when different ones of the forward timing signals are transmitted 1012
Transmit analog transmit signal via communication medium, wherein each forward timing signal prompts second communication device to transmit a respective reverse timing signal, and wherein use by the DAC of the different phases of the clock when different ones of the forward timing signals are transmitted affects timing of respective transmissions of respective ones of the reverse timing signals 1016
Receive analog receive signal via communication medium 1020
Convert analog receive signal to digital receive signal with ADC 1024
Detect a plurality of reverse timing signals in digital receive signal based on analyzing the digital receive signal 1028
Determine timing information based on detection of the plurality of reverse timing signals 1032
Determine time of flight based on timing information 1036

METHOD AND APPARATUS FOR DETERMINING TIME OF FLIGHT

CROSS REFERENCES TO RELATED APPLICATIONS

This application claims the benefit of U.S. Provisional Patent App. No. 63/417,984, entitled "Clock-Based Topology Discovery," filed on Oct. 20, 2022, the disclosure of which is expressly incorporated herein by reference in its entirety.

FIELD OF TECHNOLOGY

The present disclosure relates generally to in-vehicle communication networks, and more particularly to topology discovery within in-vehicle communication networks.

BACKGROUND

In-vehicle communication networks permit components within a vehicle to exchange data. The Institute for Electrical and Electronics Engineers (IEEE) 802.3cg Standard defines a communication protocol for communicating via a single twisted-pair cable at rates up to 10 megabits per second (Mbps), sometimes referred to as 10BASE-T1S, which is targeted for use in vehicles. The 10BASE-T1S standard supports both point-to-point and multidrop communications. With multidrop communications, three or more communication devices can communicate via a single cable.

In a multidrop network that uses the 10BASE-T1S standard, there can be multiple identical devices connected to a single twisted-pair cable, where the function of each device depends on its physical location within the vehicle. For example, there may be multiple identical radar sensors connected to a single twisted-pair cable, with a first radar located at the rear of the vehicle, a second radar located at the front of the vehicle, a third radar located near the front driver-side, and a fourth radar located near the front passenger-side. Because of its location, the first radar will function to provide object detection behind the vehicle (e.g., for when the vehicle is moving in a reverse direction); the second radar will function to provide object detection in the front of the vehicle; the third radar will function to provide object detection in a side view from the driver-side of the vehicle; and the fourth radar will function to provide object detection in a side view from the passenger-side of the vehicle.

When the general physical arrangement of the cable within the vehicle is known, a controller connected to the cable can identify the functions devices connected to the cable based on respective distances of the devices along the cable from the controller. FIG. 1 is simplified diagram of a vehicle 100 with an in-vehicle communication network 102 that includes an electronic control unit (ECU) 104 and sensors 108, 112, 116, and 120 (e.g., radar sensors, lidar sensors, etc.), electrically connected to a cable 124. The sensor 108 is located a first distance D1 along the cable 124 from the ECU 104; the sensor 112 is located a second distance D2 along the cable 124 from the ECU 104; the sensor 116 is located a third distance D3 along the cable 124 from the ECU 104; and the sensor 120 is located a fourth distance D4 along the cable 124 from the ECU 104. When the ECU 104 knows the general physical arrangement of the cable 124 within the vehicle and knows the respective distances of the sensors 108, 112, 116, and 120 along the cable 124 from the ECU 104, the ECU 104 can determine the respective functions of the sensors 108, 112, 116, and 120. For example, when the sensors 108, 112, 116, and 120 are radar sensors, the ECU 104 can use respective distances from the ECU 104 to determine that: i) the radar sensor 108 is a rear-facing radar; ii) the sensor 112 is a side-facing driver-side radar; iii) the sensor 116 is a front-facing radar; and iv) the sensor 120 is a side-facing passenger-side radar.

Although FIG. 1 illustrates a communication network comprising an ECU and sensors, a communication network comprises other suitable components such as actuators (e.g., for door locks, windows, sun/moon roof, side view mirrors, etc.), buttons, lights, etc.

One technique for determining a distance between two devices in a network such as the in-vehicle communication network 102 is to measure a time required for a signal (e.g., a pulse) to be transmitted from a first device to a second device via a communication medium (sometimes referred to as a "time of flight"). For example, the first device may transmit a forward pulse to the second device, and in response to receiving the forward pulse, the second device transmits a reverse pulse back to the first device. The first device measures a time duration between transmission of the forward pulse and reception of the reverse pulse, and uses the time duration to calculate a distance between the first device and the second device. To improve accuracy, the first device and second device may repeatedly transmit forward pulses and reverse pulses and measure an aggregate time duration for transmitting and receiving the forward and reverse pulses. For example, in response to receiving the reverse pulse, the first device transmits another forward pulse to the second device, which transmits another reverse pulse to the first device in response, and so on. Then, the first device measures a time duration between transmission of the initial forward pulse and reception of the last reverse pulse, and uses the time duration to calculate the distance between the first device and the second device.

SUMMARY

In an embodiment, a transceiver associated with a first communication device comprises: an analog-to-digital converter (ADC) configured to generate a digital receive signal based on an analog receive signal received via a communication medium; timing signal detection circuitry coupled to the ADC, the timing signal detection circuitry configured to detect a plurality of timing signals from a second communication device based on analyzing the digital receive signal; sampling phase generation circuitry coupled to the ADC, the sampling phase generation circuitry configured to adjust a sampling phase used by the ADC in connection with at least some of the timing signals so that the ADC is using different sampling phases when different ones of the timing signals are detected; timing information determination circuitry configured to determine timing information based on the detection of the plurality of timing signals when the ADC is using different sampling phases when different ones of the timing signals are detected; and a processor configured to determine the time of flight based on the timing information.

In another embodiment, a method for measuring a time of flight between a first communication device and a second communication device includes: receiving, at the first communication device, an analog receive signal via a communication medium; converting, at an ADC of the first communication device, the analog receive signal to a digital receive signal; detecting, at logic circuitry of the first communication device, a plurality of timing signals from the second communication device based on analyzing the digital receive signal; adjusting, at the logic circuitry, a sampling phase of the ADC in connection with at least some of the timing signals so that the ADC is using different sampling phases when different ones of the timing signals are detected; determining, at the logic circuitry, timing information based on the detection of the plurality of timing signals when the ADC is using different sampling phases when different ones of the timing signals are detected; and determining, at the first communication device, the time of flight based on the timing information.

In yet another embodiment, a transceiver associated with a first communication device comprises: forward signal generation circuitry configured to generate a digital transmit signal that includes a plurality of forward timing signals; a digital to analog converter (DAC) configured to generate an analog transmit signal based on the digital transmit signal; clock phase adjustment circuitry configured to adjust a phase of a clock provided to the DAC in connection with at least some of the forward timing signals so that the DAC is using different phases of the clock when different ones of the forward timing signals are transmitted; driver circuitry configured to transmit the analog transmit signal via the communication medium, wherein each forward timing signal prompts the second communication device to transmit a respective reverse timing signal, and wherein the use by the DAC of the different phases of the clock when different ones of the forward timing signals are transmitted affects timing of respective transmissions of respective ones of the reverse timing signals; an analog-to-digital converter (ADC) configured to generate a digital receive signal based on an analog receive signal received via the communication medium; timing signal detection circuitry coupled to the ADC, the timing signal detection circuitry configured to detect a plurality of reverse timing signals from the second communication device based on analyzing the digital receive signal; timing information determination circuitry configured to determine timing information based on the detection of the plurality of reverse timing signals; and a processor configured to determine the time of flight based on the timing information.

In still another embodiment, a method for measuring a time of a flight between a first communication device and a second communication device includes: generating, at the first communication device, a digital transmit signal that includes a plurality of forward timing signals; generating, at a DAC of the first communication device, an analog transmit signal based on the digital transmit signal; adjusting, at logic circuitry of the first communication device, a phase of a clock provided to the DAC in connection with at least some of the forward timing signals so that the DAC is using different phases of the clock when different ones of the forward timing signals are transmitted; transmitting, by the first communication device, the analog transmit signal via the communication medium, wherein each forward timing signal prompts the second communication device to transmit a respective reverse timing signal, and wherein the use by the DAC of the different phases of the clock when different ones of the forward timing signals are transmitted affects timing of respective transmissions of respective ones of the reverse timing signals; receiving, at the first communication device, an analog receive signal via the communication medium; converting, at an analog-to-digital converter (ADC) of the first communication device, the analog receive signal to a digital receive signal; detecting, at the logic circuitry, a plurality of reverse timing signals from the second communication device based on analyzing the digital receive signal; determining, at the logic circuitry, timing information based on the detection of the plurality of reverse timing signals; and determining, at the first communication device, the time of flight based on the timing information.

BRIEF DESCRIPTION OF THE DRAWINGS

FIG. 2 is simplified diagram of an example communication network in which various aspects, features, and elements described herein are implemented in accordance with embodiments of this disclosure.

FIG. 4 is a diagram of an illustrative example of a sampling phase output by a phase generator of the communication device of FIG. 3 as a function of a quantity of reverse pulses received by the communication device of FIG. 3, according to an embodiment.

FIG. 10 is a flow diagram of another example method for measuring a time of flight between a first communication device and a second communication device, according to another embodiment.

DETAILED DESCRIPTION

Figure 1:
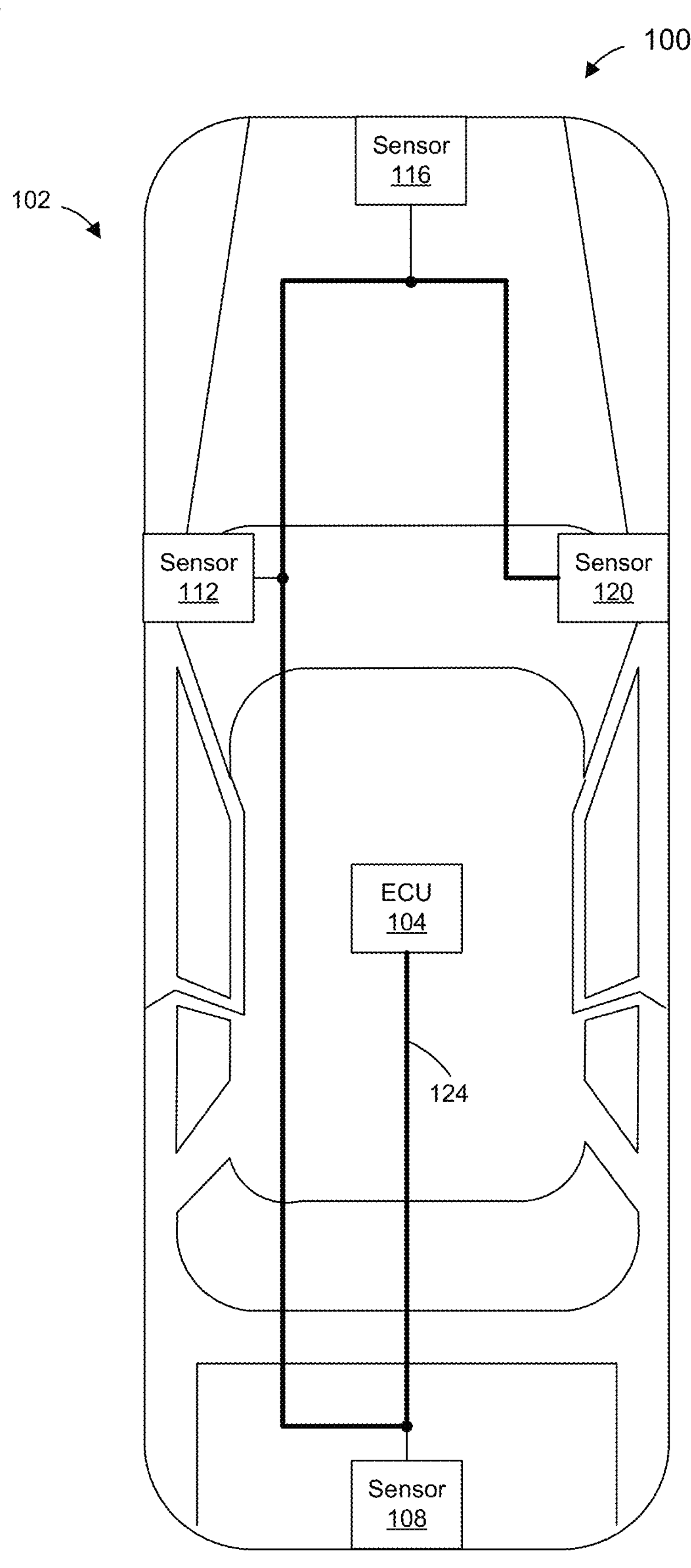
FIG. 1 is simplified diagram showing an example vehicle with an in-vehicle communication network in which various aspects, features, and elements described herein are implemented in accordance with embodiments of this disclosure.

The OPEN Alliance, in "TC14-10BASE-T1S Topology Discovery," has proposed a procedure for measuring distances between devices using the 10BASE-T1S Standard in a multidrop configuration. A first device initializes a counter to zero and transmits an initial forward pulse to a second device via a twisted-pair cable. In response to receiving the forward pulse, the second device transmits a reverse pulse to the first device via the cable. In connection with receiving the reverse pulse, the first device increments the counter. Additionally, in response to receiving the reverse pulse, the first device transmits another forward pulse to the second device via the cable. In response to receiving the forward pulse, the second device transmits a reverse pulse to the first device via the cable. The transmitting of pulses in this manner continues for a predetermined time duration. Then, the distance between the first device and the second device is calculated based on i) the number of reverse pulses received by the first device as indicated by the counter, and ii) a time required to receive the reverse pulses.

The OPEN Alliance has also proposed that the distance measurement have an accuracy of ±15 centimeters (cm), which corresponds to a time measurement resolution on the order of 100 picoseconds (ps). If pulse detection is implemented in the digital domain, this measurement accuracy implies that an analog-to-digital converter (ADC) and a digital-to-analog converter (DAC) of a transceiver performing the procedure are clocked to provide a sampling rate of 10 gigahertz (GHz). However, the 10BASE-T1S Standard specifies transmission speeds corresponding to clock rates of 10-100 megahertz (MHz), i.e., several orders of magnitude less than 10 GHz. In a transceiver that is to operate at transmission speeds of 10-100 MHz, inclusion of an ADC and a DAC capable of operating at 10 GHz sampling rate will significantly increase cost as compared to an ADC and a DAC capable of operating at 10-100 MHz sampling rates, for example.

In embodiments described below, techniques for achieving relative high measurement accuracy with relatively low sampling rates are utilized for measuring a time required for a signal to travel between devices via a communication medium, (a "time of flight"). For instance, in some embodiments, a sampling phase of an ADC is adjusted in connection with receiving multiple timing signals (e.g., pulses) such that different respective sampling phases are used by the ADC in connection with receiving different ones of the timing signals. When calculating a time of flight based on the reception of the multiple timing signals (which were received when the ADC was using different sampling phases), a significantly higher resolution is achieved as compared to if the sampling phase of the ADC were to be controlled according to prior art methods, at least in some embodiments.

In other embodiments, a phase of a clock used by a DAC is adjusted in connection with transmitting multiple timing signals (e.g., pulses) such that different respective phases of the clock are provided to the DAC in connection with transmitting different ones of the timing signals. When calculating a time of flight based on the transmission of the multiple timing signals (which correspond to times when the clock provided to the DAC had different phases), a significantly higher resolution is achieved as compared to if the phase of the clock provided to the DAC was constant, at least in some embodiments.

In at least some embodiments, the application of different sampling phases and/or different clock phases such as described above achieves a relatively high measurement resolution with a relatively low clock rate. Thus, costs can be reduced because ADCs and DACs that operate at relatively low speeds can be used.

FIG. 2 is simplified diagram of an example communication network 200 (sometimes referred to herein as "the network 200") in which various aspects, features, and elements described herein are implemented in accordance with embodiments of this disclosure. The network includes a first communication device 204 and a second communication device 208 that are communicatively coupled via a cable 212. In an embodiment, the network 200 includes one or more other communication devices (not shown) that are electrically connected to the cable 212. The cable 212 is a single twisted-pair cable, and the first communication device 204 and the second communication device 208 are configured to operate according to 10BASE-T1S, in an embodiment. In other embodiments, the cable 212 is another suitable type of cable (e.g., includes multiple twisted-pairs, a coaxial cable, a fiber optic cable, etc.). In other embodiments, the cable 212 is omitted and the first communication device 204 and the second communication device 208 communicate wirelessly. In some embodiments, the first communication device 204 and the second communication device 208 communicate according to another suitable communication protocol different than 10BASE-T1S.

The network 200 corresponds to the network 102 of FIG. 1, in an embodiment, and FIG. 2 is described with reference to FIG. 1 for explanatory purposes. For example, the first communication device 204 corresponds to the ECU 104, and the second communication device 208 corresponds to one of the sensors 108, 112, 116, and 120, in an embodiment. In other embodiments, however, the first communication device 204 is one of the sensors 108, 112, 116, and 120, and the second communication device 208 is the ECU 104. In other embodiments, the network 200 corresponds to another suitable network different than the network 102.

The first communication device 204 and the second communication device 208 are configured to perform a procedure for determining a distance between the first communication device 204 and the second communication device 208 along the cable 212. For example, the procedure comprises exchanging timing signals (e.g., pulses or other suitable timing signals) and using the exchanges of timing signals to measure a time of flight between the first communication device 204 and the second communication device 208. The first communication device 204 and/or the second communication device 208 are configured to determine the distance between the first communication device 204 and the second communication device 208 using the time of flight.

As part of the procedure for determining the distance, the first communication device 204 is configured to transmit an initial forward timing signal 220 (e.g., a pulse) to the second communication device 208 via the cable 212. In response to receiving the forward timing signal 220, the second device transmits a reverse timing signal 224 (e.g., a pulse) to the second communication device 208 via the cable 212. The forward timing signal 220 and the reverse timing signal 224 are pulses, in an embodiment, and are sometimes referred to herein as "the forward pulse 220" and "the reverse pulse 224" for simplicity. However, the forward timing signal 220 and the reverse timing signal 224 are suitable timing signals other than pulses, according to other embodiments.

In connection with receiving the reverse pulse 224, the first communication device 204 transmits another forward pulse 220 to the second communication device 208 via the cable 212. In response to receiving the forward pulse 220, the second communication device 208 transmits a reverse pulse 224 to the first communication device 204 via the cable 212. The transmitting of pulses 220, 224 continues in this manner until a time period ends, a first number of forward pulses 220 is transmitted by the first communication device 204, and/or the first communication device 204 receives a second number of reverse pulses 224, etc.

The first communication device 204 includes front end circuitry 240 communicatively coupled to the cable 212. The front end circuitry 240 includes an ADC 244 that converts an analog receive signal to a digital receive signal. The front end circuitry 240 also includes a DAC 248 that converts a digital transmit signal to an analog transmit signal. The ADC 244 and the DAC 248 are communicatively coupled to the cable 212. In some embodiments, the front end circuitry 240 includes other circuitry (e.g., one or more of hybrid circuitry, an amplifier, a driver, a filter, etc.) that is not shown for purposes of brevity. In some embodiments in which the cable 212 is not a single twisted pair cable or is omitted altogether, the front end circuitry 240 has another structure suitable for the communication medium that is used.

In some embodiments, a sampling phase of the ADC 244 is adjusted in connection with receiving multiple reverse pulses 224 such that different respective sampling phases are used by the ADC in connection with receiving different ones of the timing signals. When calculating a time of flight based on the reception of the multiple reverse pulses 224 (which were received when the ADC 244 was using different sampling phases), a significantly higher resolution is achieved as compared to if the sampling phase of the ADC 244 were to be controlled according to prior art methods, at least in some embodiments.

In other embodiments, a phase of a clock used by the DAC 248 is adjusted in connection with transmitting multiple forward pulses 220 such that different respective phases of the clock are provided to the DAC 248 in connection with transmitting different ones of the forward pulses 220. When calculating a time of flight based on the transmission of the multiple forward pulses 220 (which correspond to times when the clock provided to the DAC 248 had different phases), a significantly higher resolution is achieved as compared to if the phase of the clock provided to the DAC 248 was constant, at least in some embodiments.

Figure 3:
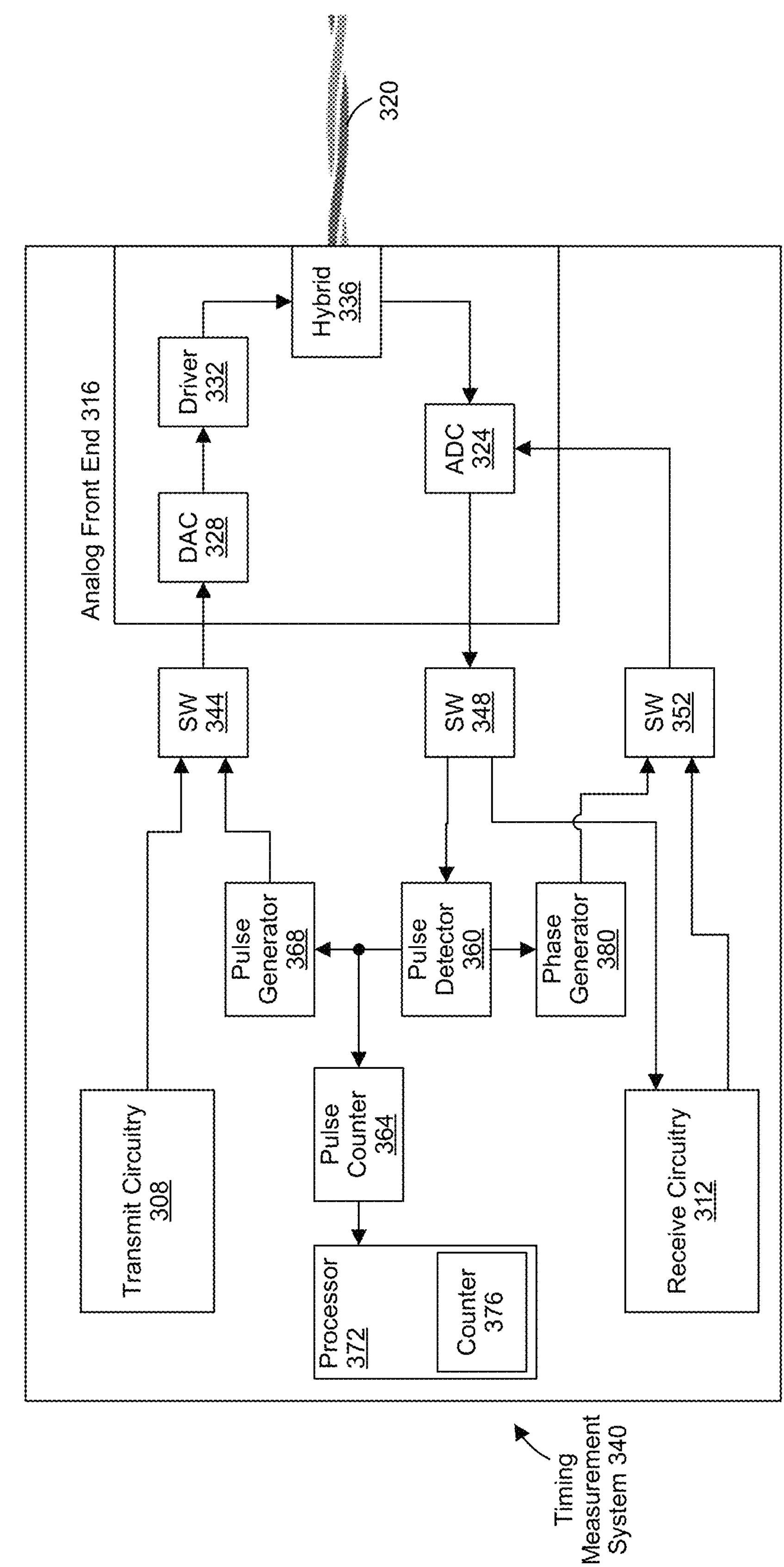
FIG. 3 is a simplified diagram of an example communication device in which various aspects, features, and elements described herein are implemented in accordance with embodiments of this disclosure.

FIG. 3 is a simplified diagram of an example communication device 300, according to an embodiment. The communication device 300 is utilized in the network 200 of FIG. 2, in an embodiment, and FIG. 3 is described with reference to FIG. 2 for explanatory purposes. For instance, the communication device 300 corresponds to the first communication device 204 of FIG. 2, in an embodiment. In other embodiments, the first communication device 204 has a suitable structure different than the communication device 300, and/or the communication device 300 is used in a suitable communication network different than the network 200.

The communication device 300 includes transmit circuitry 308 and receive circuitry 312, both of which are coupled to analog front end circuitry 316. The front end circuitry 316 is communicatively coupled to a cable 320. The cable 320 is a single twisted-pair cable, and the communication device 300 is configured to operate according to 10BASE-T1S, in an embodiment. In other embodiments, the cable 320 is another suitable type of cable (e.g., includes multiple twisted-pairs, a coaxial cable, a fiber optic cable, etc.). In other embodiments, the cable 320 is omitted, and the communication device 300 communicates wirelessly. In some embodiments, the communication device 300 is configured to operate according to another suitable communication protocol different than 10BASE-T1S.

The front end circuitry 316 includes an ADC 324 that converts an analog receive signal received via the cable 320 to a digital receive signal. The front end circuitry 316 also includes a DAC 328 that converts a digital transmit signal to an analog transmit signal for transmission via the cable 320. The front end circuitry 316 also includes driver circuitry 332 coupled to an output of the DAC 328. The driver circuitry 332 and the ADC 244 are communicatively coupled to the cable 320 via a hybrid circuit 336. In some embodiments, the front end circuitry 316 includes other circuitry (e.g., one or more of an amplifier, a driver, a filter, etc.) that is not shown for purposes of brevity. In some embodiments in which the cable 320 is not a single twisted pair cable or is omitted altogether, the front end circuitry 316 has another structure suitable for the communication medium that is used.

The communication device 300 includes a timing measurement system 340, which is configured to determine a time of flight with respect to another communication device (not shown) based on timing signals received from the other communication device via the cable 320.

The transmit circuitry 308 and the timing measurement system 340 are selectively coupled to the DAC 328 via a switch 344. The receive circuitry 312 and the timing measurement system 340 are selectively coupled to the ADC 324 via a switch 348 and a switch 352. During normal operation (e.g., when the communication device 300 is communicating user information via the cable 320), the switches 344, 348, 352 are controlled to i) couple the transmit circuitry 308 and the receive circuitry 312 to the analog front end 316, and ii) isolate the timing measurement system 340 from the analog front end 316. During a time of flight measurement procedure, however, the switches 344, 348, 352 are controlled to i) couple the timing measurement system 340 to the analog front end 316, and ii) isolate the transmit circuitry 308 and the receive circuitry 312 from the analog front end 316.

The timing measurement system 340 includes a pulse generator 368 having an output coupled to an input of the switch 344. The pulse generator 368 is configured to generate a digital transmit signal that includes a plurality of forward pulses, such as the forward pulses 220. When the pulse generator 368 is coupled to the DAC 328 by the switch 344, the DAC 328 converts the digital transmit signal to an analog transmit signal that includes a plurality of analog forward pulses for transmission via the cable 320.

The timing measurement system 340 also includes a pulse detector 360 having an input coupled to an output of the switch 348. The pulse detector 360 is configured to analyze a digital receive signal, which is output by the ADC 324, to detect a plurality of reverse pulses, such as the reverse pulses 224, in the digital receive signal. Thus, when the pulse detector 360 is coupled to the ADC 324 by the switch 348, the pulse detector 360 analyze the digital receive signal output by the ADC 324 to detect the plurality of reverse pulses received from the other communication device via the cable 320. When the pulse detector 360 detects a pulse in the digital receive signal, the pulse detector generates a pulse detection signal.

A counter 364 (referred to herein as the "pulse counter 364") is coupled to the pulse detector 360. The pulse counter 364 counts reverse pulses detected by the pulse detector 360. The pulse counter 364 is configured to increment a count in response to each pulse detection signal output by the pulse detector 360.

The pulse generator 368 is also coupled to the pulse detector 360. The pulse generator 368 is configured to generate, in the digital transmit signal, a forward pulse in response to each of at least some of the pulse detection signals output by the pulse detector 360. In an embodiment, the pulse generator 368 is configured to introduce a time delay between when the pulse detection signal is output by the pulse detector 360 and a beginning of the corresponding forward pulse output by the pulse generator 368. Thus, in response to the communication device 300 receiving a reverse pulse via the cable 320, the communication device 300 transmits a forward pulse.

The timing measurement system 340 also includes a processor 372. The processor 372 is configured to control operation of the timing measurement system 340 during the time of flight measurement procedure. For example, the processor 372 is configured to prompt the pulse generator 368 to transmit an initial forward pulse during the time of flight measurement procedure, in an embodiment. In connection with an end of the time of flight measurement procedure, the processor 372 is also configured to calculate a time of flight based on i) the count of reverse pulses output by the pulse counter 364, and ii) a time period from when the initial forward pulse was transmitted and when a last reverse pulse was received. In an embodiment, the processor 372 includes a counter 376 that is used to count a number of clock cycles from when the initial forward pulse was transmitted and when a last reverse pulse was received, where the number of clock cycles output by the counter 376 indicates the time period from when the initial forward pulse was transmitted and when a last reverse pulse was received. In an embodiment, the processor 372 starts the counter 376 in connection with the communication device 300 transmitting the initial forward pulse of the time of flight measurement procedure, and stops the counter 376 in connection with the communication device 300 receiving a last reverse pulse of the time of flight measurement procedure. In an embodiment, the processor 372 starts the counter 376 in response to a start of the time of flight measurement procedure, and stops the counter 376 in response to the pulse detector 360 detecting the last reverse pulse of the time of flight measurement procedure.

In another embodiment, the counter 376 is a countdown counter, and the processor 372 starts the counter 376 in response to a start of the time of flight measurement procedure. When the counter 376 reaches a predetermined value (e.g., zero), the processor 372 determines that the time of flight measurement procedure has ended.

The timing measurement system 340 also includes a phase generator 380 having an output coupled to an input of the switch 352. During normal operation, the switch 352 couples an output of the receive circuitry 312 to a sampling phase input of the ADC 324, and the receive circuitry 312 controls the sampling phase of the ADC 324 to adjust to a clock at which the other communication device (not shown) is transmitting transmit symbols to the communication device 300. On the other hand, during the time of flight measurement procedure, the sampling phase of the ADC 324 is adjusted by the phase generator 380.

The phase generator 380 is configured to provide different sampling phases to the ADC 324 in connection with the communication device 300 receiving reverse pulses such that different respective sampling phases are used by the ADC 324 in connection with receiving different ones of the reverse pulses. The phase generator 380 is coupled to the pulse detector 360 and is configured to change the sampling phase in response to the pulse detector 360 detecting reverse pulses, in an embodiment. In an embodiment, the phase generator 380 changes the sampling phase in response to each reverse pulse detected by the pulse detector 360. In other embodiments, the phase generator 380 changes the sampling phase at some other suitable frequency, such as i) every N reverse pulses detected by the pulse detector 360, where N is a suitable integer greater than one, ii) every M clock cycles, where M is a suitable positive integer, iii) a suitable time frequency, etc. In an embodiment, the phase generator 380 is configured to change the sampling phase by incrementing the sampling phase by a fixed amount at a suitable frequency such as described above. In an embodiment, the phase generator 380 increments the sampling phase in a modulo manner such that the sampling phase remains in a predetermined range of sampling phases. For example, the phase generator 380 increments the sampling phase by a predetermined amount in a modulo manner at a suitable frequency such as described above.

In some embodiments, the timing measurement system 340 comprises logic circuitry configured to perform acts such as described above. For example, in some embodiments, the processor 372 comprises logic circuitry such as a hardware state machine configured to perform acts corresponding to the processor 372 such as described above. In other embodiments, the timing measurement system 340 also comprises a processor that executes machine readable instructions stored in a memory coupled to the processor, where the machine readable instructions, when executed by the processor, cause the processor to perform acts such as described above. For example, the processor 372 includes a processor that executes machine readable instructions that, when executed by the processor, cause the processor to perform acts corresponding to the processor 372 such as described above.

FIG. 4 is a diagram of an illustrative example of the sampling phase output by the phase generator 380 as a function of a quantity of reverse pulses received by the communication device 300, according to an embodiment. In other embodiments, the phase generator 380 outputs other suitable sampling phases that are different than the example of FIG. 4. As illustrated in FIG. 4, the sampling phase incrementally increases in a modulo manner as the number of reverse pulses increases so that the sampling phase remains within a fixed range of sampling phases.

Figure 5:
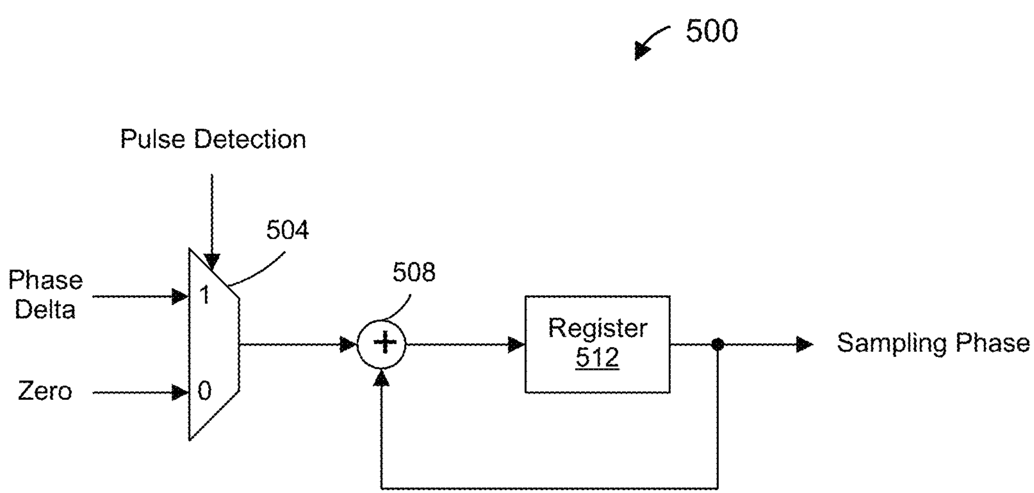
FIG. 5 is a simplified diagram of an example phase generator of the communication device of FIG. 3, according to an embodiment.

FIG. 5 is a simplified diagram of an example phase generator 500, according to an embodiment. The phase generator 500 corresponds to the phase generator 380 of FIG. 3, in an embodiment, and FIG. 5 is described with reference to FIG. 3 for explanatory purposes. In other embodiments, the phase generator 380 has a suitable structure different than the phase generator 500, and/or the phase generator 500 is used in a suitable communication device different than the communication device 300.

The phase generator 500 includes a multiplexer 504 having a first input set to zero and a second input set to a value by which the sampling phase is to be adjusted ("phase delta"). A selection input of the multiplexer 504 is coupled to the output of the pulse detector 360. When no reverse pulse is detected by the pulse detector 360, the multiplexer 504 outputs zero. On the other hand, when the pulse detector 360 detects a reverse pulse, the multiplexer 504 outputs the phase delta.

The output of the multiplexer 504 is coupled to a first input of an adder 508. An output of the adder 508 is coupled to an input of a register 512. An output of the register 512 is coupled to a second input of the adder 508.

In operation, the phase generator 500 begins by outputting zero. As each reverse pulse is detected, the output of the phase generator 500 increments by a phase delta. Because the adder 508 and the register 512 have a limited number of bits, the sampling phase (e.g., the output of the register 512) wraps around in a manner similar to the sampling phase illustrated in FIG. 4. Thus, the phase generator 500 increments the sampling phase in a modulo manner so that the sampling phase remains in a fixed range of sampling phases, in an embodiment.

Referring again to FIG. 3, in other embodiments, the phase generator 380 is configured to adjust the sampling phase in a different suitable manner such that the sampling phase output by the phase generator 380 does not increment such as described above with reference to FIGS. 4 and 5. For example, the phase generator 380 adjusts the sampling phase so that the sampling phase output by the phase generator 380 decrements in a modulo manner similar to the methods/apparatus described above with reference to FIGS. 4 and 5. As another example, the phase generator 380 adjusts the sampling phase in a predetermined manner (e.g., according to a pseudorandom sequence of different sampling phases, according to a repeating fixed sequence of different sampling phases, etc.) such that each sampling phase, from a set of sampling phases, is used in connection with detecting an approximately equal number of timing signals during the measurement procedure (i.e., no sampling phase is used in connection with detecting more than one additional timing signal as compared to any other sampling phase during the measurement procedure), according to an embodiment. In other words, each sampling phase is used in connection with detecting at least X timing signals during the measurement procedure, and no sampling phase is used in connection with detecting more than X+1 timing signals during the measurement procedure, where X is a suitable positive integer greater than one, according to an embodiment.

As an illustrative example, the measurement procedure has a duration that spans multiple time intervals, and the phase generator 380 adjusts the sampling phase in a predetermined manner such that each sampling phase, from the set of sampling phases, is used in connection with detecting only an equal number (e.g., one, two, three, etc.) of timing signals during each time interval, according to an embodiment.

More generally, the measurement procedure has a duration that spans multiple time intervals, and the phase generator 380 adjusts the sampling phase so that each sampling phase, from the set of sampling phases, is used in connection with detecting only an equal number (e.g., one, two, three, etc.) of timing signals during each time interval, according to some embodiments.

Figure 6:
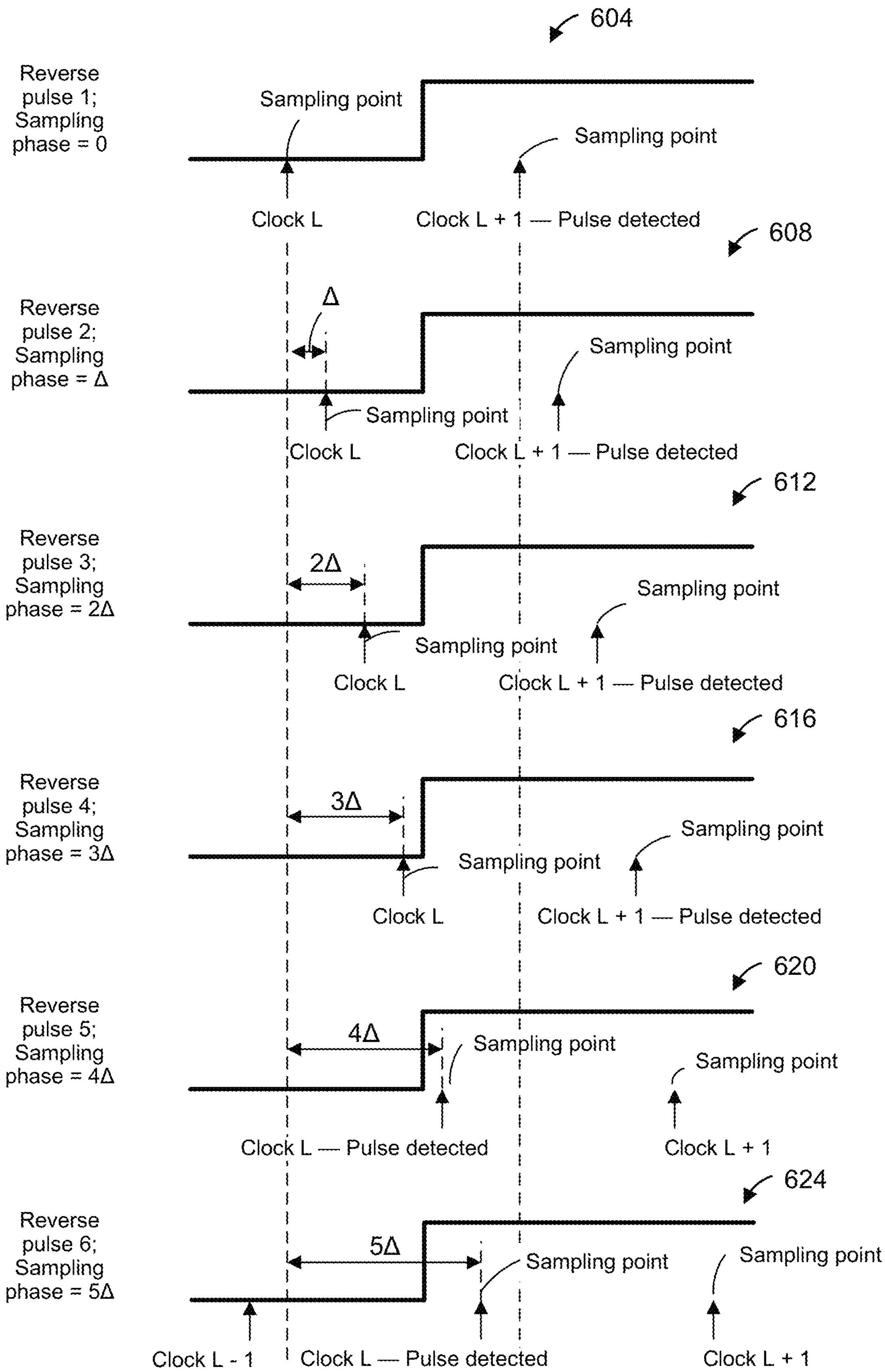
FIG. 6 is a set of diagrams illustrating multiple reverse pulses being received by the communication device of FIG. 3 while an analog to digital converter (ADC) of the communication device of FIG. 3 is using different sampling phases, according to an embodiment.

FIG. 6 is a set of diagrams illustrating multiple reverse pulses being received by the communication device 300 while the ADC 324 is using different sampling phases, according to an embodiment.

Diagram 604 illustrates a reverse pulse 1 that is received while the ADC 324 is using a sampling phase of zero. The rising edge of the reverse pulse 1 occurs between a clock edge L and a clock edge L+1. As a result, the reverse pulse 1 is not reflected in an output of the ADC 324 until the clock edge L+1, and the pulse detector 360 does not detect the reverse pulse 1 until after the clock edge L+1.

Diagram 608 illustrates a reverse pulse 2 that is received while the ADC 324 is using a sampling phase of Δ. Again, the rising edge of the reverse pulse 2 occurs between the clock edge L and the clock edge L+1. As a result, the reverse pulse 2 is not reflected in the output of the ADC 324 until the clock edge L+1, and the pulse detector 360 does not detect the reverse pulse 2 until after the clock edge L+1.

Diagram 612 illustrates a reverse pulse 3 that is received while the ADC 324 is using a sampling phase of 2Δ. Again, the rising edge of the reverse pulse 3 occurs between the clock edge L and the clock edge L+1. As a result, the reverse pulse 3 is not reflected in the output of the ADC 324 until the clock edge L+1, and the pulse detector 360 does not detect the reverse pulse 3 until after the clock edge L+1.

Diagram 616 illustrates a reverse pulse 4 that is received while the ADC 324 is using a sampling phase of 3Δ. Again, the rising edge of the reverse pulse 4 occurs between the clock edge L and the clock edge L+1. As a result, the reverse pulse 4 is not reflected in the output of the ADC 324 until the clock edge L+1, and the pulse detector 360 does not detect the reverse pulse 4 until after the clock edge L+1.

Diagram 620 illustrates a reverse pulse 5 that is received while the ADC 324 is using a sampling phase of 4Δ. Now, the rising edge of the reverse pulse 5 occurs prior to clock edge L. As a result, the reverse pulse 5 is reflected in the output of the ADC 324 at the clock edge L, and the pulse detector 360 detects the reverse pulse 5 in connection with the clock edge L.

Diagram 624 illustrates a reverse pulse 6 that is received while the ADC 324 is using a sampling phase of 5Δ. The rising edge of the reverse pulse 6 occurs prior to clock edge L. As a result, the reverse pulse 6 is reflected in the output of the ADC 324 at the clock edge L, and the pulse detector 360 detects the reverse pulse 6 in connection with the clock edge L.

More generally, during a timing measurement procedure in which the sampling phase of the ADC 324 is adjusted as described above, m reverse pulses will be detected in connection with the clock edge L, and n reverse pulses will be detected in connection with the clock edge L+1, where the ratio of m to n varies depending on how far from the clock edge L the reverse pulse occurs when the sampling phase is zero.

A total measurement time with respect to receiving m+n multiple reverse pulses can be represented as:

$$(m*L+n*(L+1))*T \qquad \text{Equ. 1}$$

where T is a period of the sampling clock. The average of the time to receive each reverse pulse can be represented as:

$$(L+n/(m+n))*T \qquad \text{Equ. 2}$$

As can be seen by Equ. 2, adjusting the sampling phase of the ADC 324 as described above while receiving multiple reverse pulses provides a higher resolution time measurement as compared to receiving the multiple reverse pulses while keeping the sampling phase of the ADC 324 constant, at least in some embodiments. For example, the term n/(m+n) indicates where in between the clock edges L and L+1 the reverse pulse occurs when the sampling phase is zero.

Figure 7:
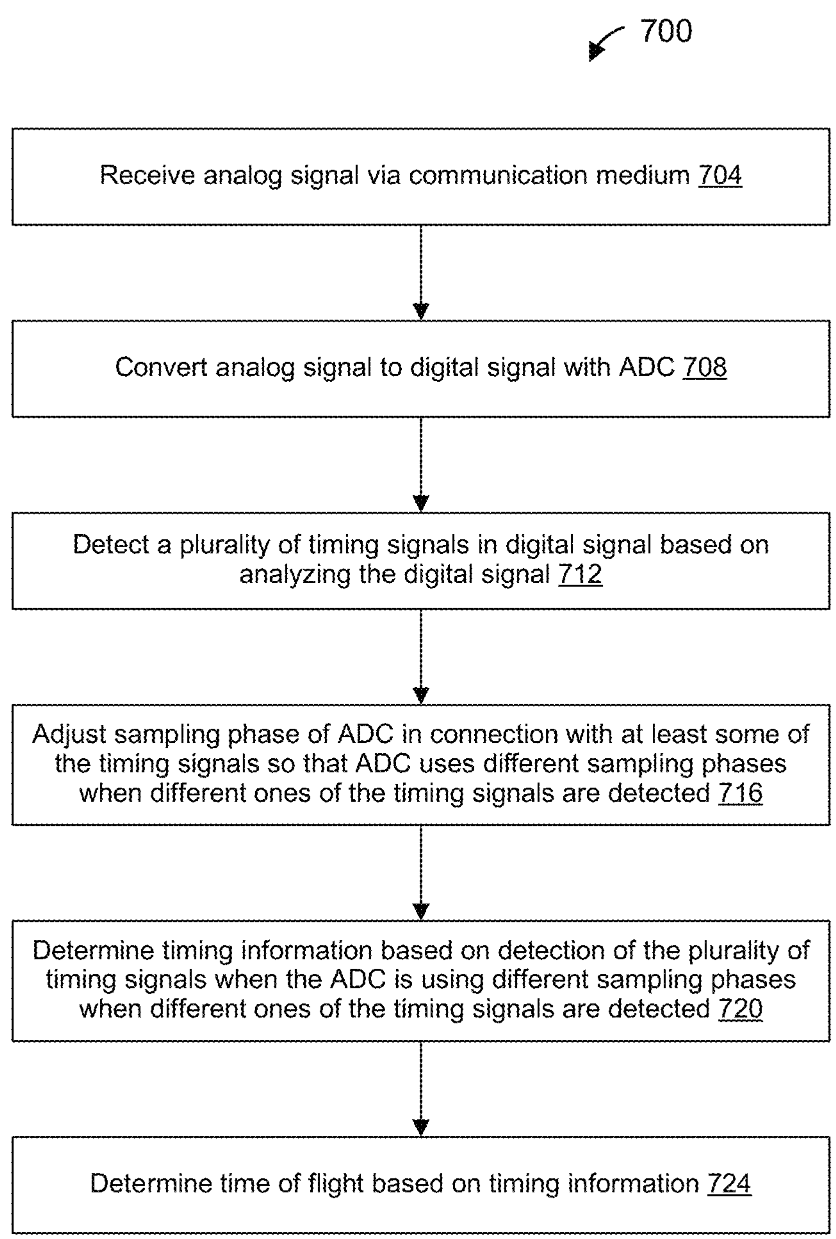
FIG. 7 is a flow diagram of an example method for measuring a time of flight between a first communication device and a second communication device, according to an embodiment.

FIG. 7 is a flow diagram of an example method 700 for measuring a time of flight between a first communication device and a second communication device, according to an embodiment. The method 700 is implemented in the network 102 of the vehicle 100 of FIG. 1, according to an embodiment. Additionally or alternatively, the method 700 is implemented by a communication device having a structure like the communication device 300 of FIG. 3, in some embodiments. FIG. 7 is described with reference to FIG. 3 for ease of explanation. In other embodiments, the method 700 is implemented in another suitable vehicle different than the vehicle 100 of FIG. 1, and/or in another suitable communication device different than the communication device 300 of FIG. 3.

At block 704, the first communication device receives an analog receive signal via a communication medium. For example, the communication device 300 receives an analog receive signal via the cable 320.

At block 708, an ADC of the first communication device converts the analog receive signal to a digital receive signal. For example, the ADC 324 converts the analog receive signal received via the cable 320 to a digital receive signal.

At block 712, logic circuitry of the first communication device detects a plurality of timing signals from the second communication device based on analyzing the digital receive signal. For example, the pulse detector 360 detects a plurality of reverse pulses from the second communication device based on analyzing the digital receive signal output by the ADC 324. In other embodiments, the timing signals are suitable signals other than pulses. For example, the timing signal comprises a predetermined pattern, and the logic circuitry includes correlation or autocorrelation circuitry that is used to detect the predetermined pattern, in other embodiments.

At block 716, the logic circuitry adjusts a sampling phase of the ADC in connection with at least some of the timing signals so that the ADC is using different sampling phases when different ones of the timing signals are detected. For example, the output of the phase generator 380 is used to adjust the sampling phase of the ADC 324.

Adjusting the sampling phase of the ADC at block 716 includes adjusting the sampling phase in connection with detecting each of the at least some of the timing signals. For example, the phase generator 380 adjusts the sampling phase in response to the pulse detector 360 detecting a reverse pulse. In an embodiment, the phase generator 380 increments the sampling phase by a predetermined amount in response to the pulse detector 360 detecting a reverse pulse. In an embodiment, the phase generator 380 increment the sampling phase in a modulo manner so that the sampling phase remains in a predetermined range of sampling phases.

In an embodiment, adjusting the sampling phase at block 716 comprises adjusting the sampling phase in response to each timing signal detected at block 712. In other embodiments, adjusting the sampling phase at block 716 comprises adjusting the sampling phase at some other suitable frequency, such as i) every N timing signals detected at block 712, where N is a suitable integer greater than one, ii) every M clock cycles, where M is a suitable positive integer, iii) a suitable time frequency, etc.

In an embodiment, adjusting the sampling phase at block 716 comprises incrementing the sampling phase by a fixed amount at a suitable frequency such as described above. In an embodiment, the sampling phase is incremented in a modulo manner such that the sampling phase remains in a predetermined range of sampling phases.

In an embodiment, adjusting the sampling phase at block 716 comprises adjusting the sampling phase in response to detecting each of the at least some of the timing signals at block 712.

At block 720, the logic circuitry determines timing information based on the detection of the plurality of timing signals at block 712 when the ADC is using different sampling phases when different ones of the timing signals are detected. For example, the pulse counter 364 counts detected reverse pulses and the counter 376 measures a time period (e.g., a number of clocks) during which the detected reverse pulses were received by the communication device 300.

At block 724, the first communication device determines the time of flight based on the timing information. For example, the processor 372 determines the time of flight based on the count of detected reverse pulses (as measured by the pulse counter 364) and the time period (as measured by the counter 376) during which the detected reverse pulses were received by the communication device 300.

In an embodiment, determining the timing information at block 720 comprises: counting, at the logic circuitry, timing signals detected by the logic circuitry, and determining, at the first communication device, a time period until a number of timing signals are detected; and determining the time of flight at block 724 comprises determining the time of flight based on i) the number of timing signals, and ii) the time period. In an embodiment, determining the time period comprises counting a number of cycles of a clock until the number of timing signals is detected; and determining the time of flight comprises determining the time of flight based on i) the number of timing signals, and ii) the number of cycles of the clock.

In another embodiment, the timing signals are reverse timing signals; and the method 700 further comprises: generating, at the first communication device, an analog transmit signal that includes a plurality of forward timing signals; and transmitting, by the first communication device, the analog transmit signal via the communication medium, wherein each forward timing signal prompts the second communication device to transmit a respective reverse timing signal.

In some embodiments, a phase of clock provided to a DAC of the communication device is adjusted in connection with transmitting forward timing signals rather than adjusting a sampling phase of an ADC in connection with receiving reverse timing signals.

Figure 8:
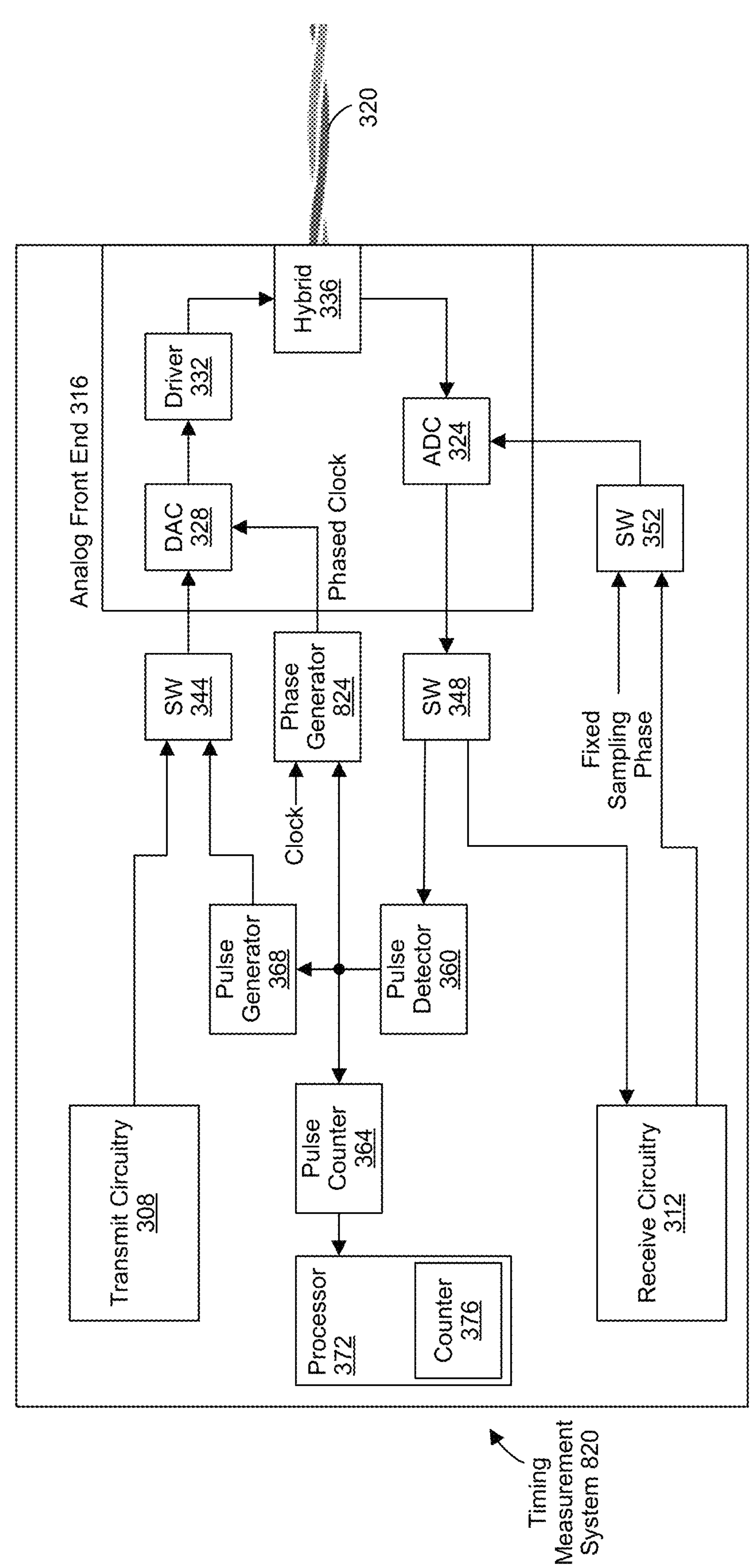
FIG. 8 is a simplified diagram of another example communication device in which various aspects, features, and elements described herein are implemented in accordance with embodiments of this disclosure.

FIG. 8 is a simplified diagram of another example communication device 800, according to another embodiment. The communication device 800 is utilized in the network 200 of FIG. 2, in an embodiment, and FIG. 8 is described with reference to FIG. 2 for explanatory purposes. For instance, the communication device 800 corresponds to the first communication device 204 of FIG. 2, in an embodiment. In other embodiments, the first communication device 204 has a suitable structure different than the communication device 800, and/or the communication device 800 is used in a suitable communication network different than the network 200.

The communication device 800 is similar to the communication device 300 of FIG. 3 and includes like-numbered elements that are not described again in detail for purposes of brevity.

Unlike the communication device 300, the communication device 800 omits phase generator 380, and an input of the switch 352 instead receives a constant phase input. During normal operation, the switch 352 couples the output of the receive circuitry 312 to the sampling phase input of the ADC 324, and the receive circuitry 312 controls the sampling phase of the ADC 324 to adjust to a clock at which the other communication device (not shown) is transmitting transmit symbols to the communication device 300. On the other hand, during the time of flight measurement procedure, the sampling phase of the ADC 324 is set to the fixed sampling phase, in an embodiment.

Also unlike the communication device 300, the communication device 800 includes a phase generator 824 having i) an input that receives a clock, and ii) an output coupled to a clock input of the DAC 328. The phase generator 824 includes another input coupled to the pulse detector 360. During normal operation, the phase generator 824 passes the clock to the DAC 328 without adjusting a phase of the clock, according to an embodiment. On the other hand, during the time of flight measurement procedure, the phase generator 824 adjusts a phase of the clock provided to the DAC 328.

The phase generator 824 is configured to provide different clock phases to the DAC 328 in connection with the communication device 800 transmitting forward pulses such that different respective clock phases are used by the DAC 328 in connection with transmitting different ones of the forward pulses. The phase generator 824 is configured to change the clock phase in response to the pulse detector 360 detecting reverse pulses, in an embodiment. In an embodiment, the phase generator 824 changes the clock phase in response to each reverse pulse detected by the pulse detector 360. In other embodiments, the phase generator 824 changes the clock phase at some other suitable frequency, such as i)

every N reverse pulses detected by the pulse detector 360, where N is a suitable integer greater than one, ii) every M clock cycles, where M is a suitable positive integer, iii) a suitable time frequency, etc. In an embodiment, the phase generator 824 is configured to change the clock phase by incrementing the clock phase by a fixed amount at a suitable frequency such as described above. In an embodiment, the phase generator 824 increments the clock phase in a modulo manner such that the clock phase remains in a predetermined range of clock phases. For example, the phase generator 824 increments the clock phase by a predetermined amount in a modulo manner at a suitable frequency such as described above.

In some embodiments, the timing measurement system 820 comprises logic circuitry configured to perform acts such as described above. For example, in some embodiments, the processor 372 comprises logic circuitry such as a hardware state machine configured to perform acts corresponding to the processor 372 such as described above. In other embodiments, the timing measurement system 820 also comprises a processor that executes machine readable instructions stored in a memory coupled to the processor, where the machine readable instructions, when executed by the processor, cause the processor to perform acts such as described above. For example, the processor 372 includes a processor that executes machine readable instructions that, when executed by the processor, cause the processor to perform acts corresponding to the processor 372 such as described above.

In embodiments in which another communication device transmits reverse timing signals (e.g., reverse pulses) responsive to the forward timing signals (e.g., forward pulses), use by the DAC 328 of the different phases of the clock when different ones of the forward timing signals are transmitted affects timing of respective transmissions of respective ones of the reverse timing signals in a manner similar to that discussed above with reference to FIGS. 3 and 6.

Figure 9:
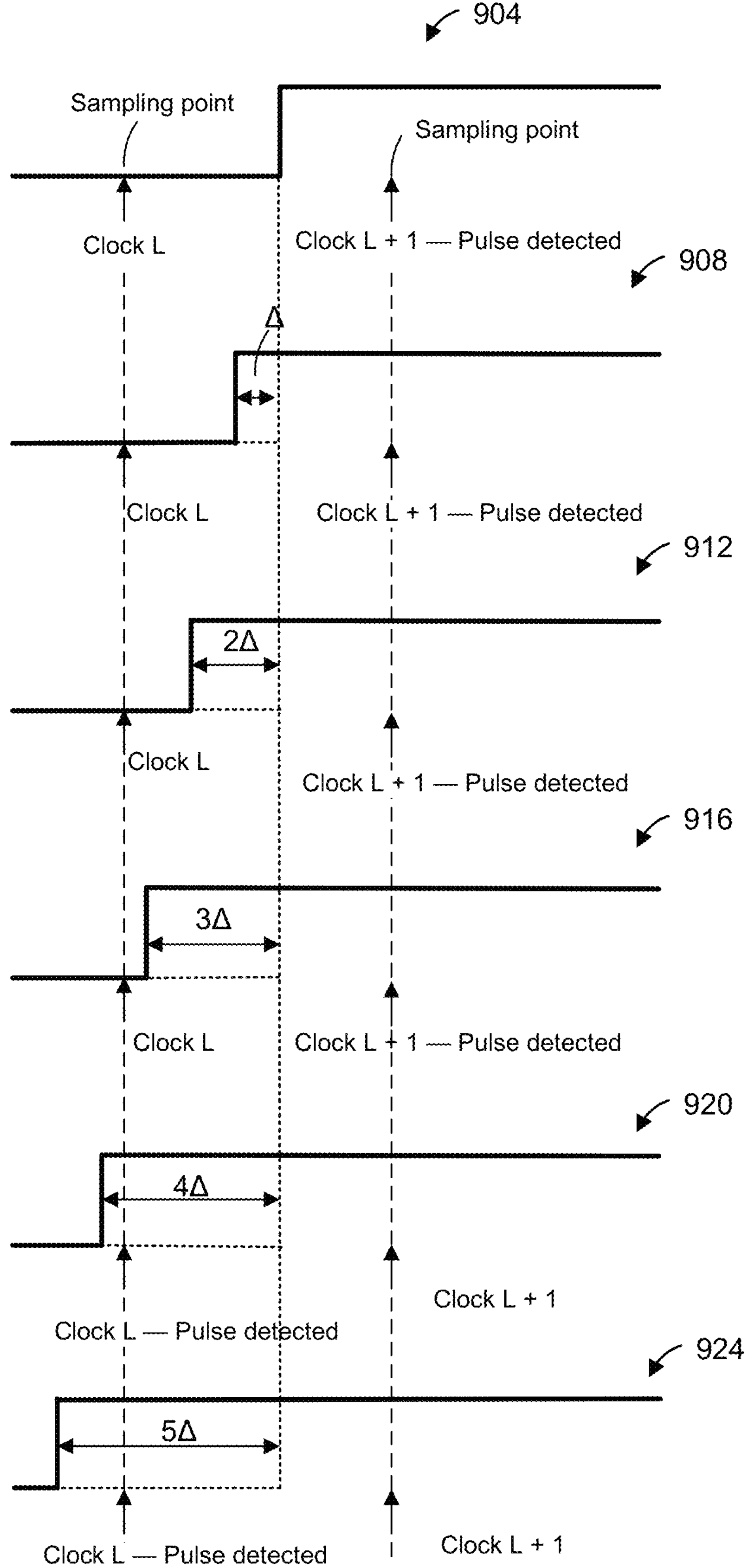
FIG. 9 is a set of diagrams illustrating multiple reverse pulses being received by the communication device of FIG. 8 in connection with a digital to analog converter (DAC) using different clock phases when transmitting corresponding forward pulses that prompted the reverse pulses, according to an embodiment.

FIG. 9 is a set of diagrams illustrating multiple reverse pulses being received by the communication device 800 in connection with the DAC 328 using different clock phases when transmitting corresponding forward pulses that prompted the reverse pulses, according to an embodiment.

Diagram 904 illustrates a reverse pulse 1 that corresponds to the DAC 328 using a sampling phase of zero in connection with transmitting a transmit pulse 1 that prompted reverse pulse 1. The rising edge of the reverse pulse 1 occurs between a clock edge L and a clock edge L+1. As a result, the reverse pulse 1 is not reflected in an output of the ADC 324 until the clock edge L+1, and the pulse detector 360 does not detect the reverse pulse 1 until after the clock edge L+1.

Diagram 908 illustrates a reverse pulse 2 that corresponds to the DAC 328 using a sampling phase of −Δ in connection with transmitting a transmit pulse 2 that prompted reverse pulse 2. Again, the rising edge of the reverse pulse 2 occurs between the clock edge L and the clock edge L+1. As a result, the reverse pulse 2 is not reflected in the output of the ADC 324 until the clock edge L+1, and the pulse detector 360 does not detect the reverse pulse 2 until after the clock edge L+1.

Diagram 912 illustrates a reverse pulse 3 that corresponds to the DAC 328 using a sampling phase of −2Δ in connection with transmitting a transmit pulse 3 that prompted reverse pulse 3. Again, the rising edge of the reverse pulse 3 occurs between the clock edge L and the clock edge L+1. As a result, the reverse pulse 3 is not reflected in the output of the ADC 324 until the clock edge L+1, and the pulse detector 360 does not detect the reverse pulse 3 until after the clock edge L+1.

Diagram 916 illustrates a reverse pulse 4 that corresponds to the DAC 328 using a sampling phase of −3Δ in connection with transmitting a transmit pulse 4 that prompted reverse pulse 4. Again, the rising edge of the reverse pulse 4 occurs between the clock edge L and the clock edge L+1. As a result, the reverse pulse 4 is not reflected in the output of the ADC 324 until the clock edge L+1, and the pulse detector 360 does not detect the reverse pulse 4 until after the clock edge L+1.

Diagram 920 illustrates a reverse pulse 5 that corresponds to the DAC 328 using a sampling phase of −4Δ in connection with transmitting a transmit pulse 5 that prompted reverse pulse 5. Now, the rising edge of the reverse pulse 5 occurs prior to clock edge L. As a result, the reverse pulse 5 is reflected in the output of the ADC 324 at the clock edge L, and the pulse detector 360 detects the reverse pulse 5 in connection with the clock edge L.

Diagram 924 illustrates a reverse pulse 6 that corresponds to the DAC 328 using a sampling phase of −5Δ in connection with transmitting a transmit pulse 6 that prompted reverse pulse 6. The rising edge of the reverse pulse 6 occurs prior to clock edge L. As a result, the reverse pulse 6 is reflected in the output of the ADC 324 at the clock edge L, and the pulse detector 360 detects the reverse pulse 6 in connection with the clock edge L.

More generally, during a timing measurement procedure in which the sampling phase of the DAC 328 is adjusted as described above, m reverse pulses will be detected in connection with the clock edge L, and n reverse pulses will be detected in connection with the clock edge L+1, where the ratio of m to n varies depending on how far from the clock edge L the reverse pulse occurs when the sampling phase is zero.

A total measurement time (in terms of clock cycles) with respect to receiving m+n multiple reverse pulses can be represented as indicated in Equ. 1, and the average of the time (in terms of clock cycles) to receive each reverse pulse can be represented as indicated in Equ. 2. As can be seen by Equ. 2, adjusting the clock phase of the DAC 328 as described above while transmitting multiple forward pulses provides a higher resolution time measurement as compared to transmitting the multiple forward pulses while keeping the clock phase of the DAC 328 constant, at least in some embodiments. For example, the term n/(m+n) indicates where in between the clock edges L and L+1 the reverse pulse occurs when the sampling phase is zero.

FIG. 10 is a flow diagram of an example method 1000 for measuring a time of flight between a first communication device and a second communication device, according to an embodiment. The method 1000 is implemented in the network 102 of the vehicle 100 of FIG. 1, according to an embodiment. Additionally or alternatively, the method 1000 is implemented by a communication device having a structure like the communication device 800 of FIG. 8, in some embodiments. FIG. 10 is described with reference to FIG. 8 for ease of explanation. In other embodiments, the method 1000 is implemented in another suitable vehicle different than the vehicle 100 of FIG. 1, and/or in another suitable communication device different than the communication device 800 of FIG. 8.

At block 1004, the first communication device generates a digital transmit signal that includes a plurality of forward timing signals. For example, the pulse generator 368 generates a digital transmit signal that includes a plurality of forward pulses. In other embodiments, the forward timing signals are suitable signals other than pulses. For example, the forward timing signal comprises a predetermined pattern, and the first communication device includes circuitry that is configured to generate each forward signal according to the predetermined pattern, in other embodiments.

At block 1008, a DAC of the first communication device generates an analog transmit signal based on the digital transmit signal. For example, the DAC 328 generates an analog transmit signal based on the digital transmit signal. The analog transmit signal is for transmission via the cable 320, according to an embodiment. The analog transmit signal includes analog versions of the forward timing signals in the digital transmit signal.

At block 1012, logic circuitry of the first communication device adjusts a phase of a clock provided to the DAC in connection with at least some of the forward timing signals so that the DAC is using different phases of the clock when different ones of the forward timing signals are transmitted by the first communication device. Adjusting the phase of the clock at block 2008 is discussed further below.

At block 1016, the first communication device transmits the analog transmit signal via the communication medium. For example, the communication device 800 transmits the analog transmit signal via the cable 320. The analog version of each forward timing signal prompts the second communication device to transmit a respective reverse timing signal, in an embodiment. The use by the DAC of the different phases of the clock when different ones of the analog versions of the forward timing signals are transmitted affects timing of respective transmissions of respective ones of the reverse timing signals, in an embodiment.

At block 1020, the first communication device receives an analog receive signal via the communication medium. For example, the communication device 800 receives the analog receive signal via the cable 320.

At block 1024, an ADC of the first communication device converts the analog receive signal to a digital receive signal. For example, the ADC 324 converts the analog receive signal received via the cable 320 to a digital receive signal.

At block 1028, the logic circuitry detects a plurality of reverse timing signals from the second communication device based on analyzing the digital receive signal. For example, the pulse detector 360 detects a plurality of reverse pulses from the second communication device based on analyzing the digital receive signal output by the ADC 324. In other embodiments, the timing signals are suitable signals other than pulses. For example, the timing signal comprises a predetermined pattern, and the logic circuitry includes correlation or autocorrelation circuitry that is used to detect the predetermined pattern, in other embodiments.

Referring again to block 1012, adjusting the phase of the clock provided to the DAC at block 1012 includes adjusting the phase of the clock in connection with detecting each of the at least some of the reverse timing signals at block 1028. For example, the phase generator 380 adjusts the phase of the clock in response to the pulse detector 360 detecting a reverse pulse. In an embodiment, the phase generator 380 increments the phase of the clock by a predetermined amount in response to the pulse detector 360 detecting a reverse pulse. In an embodiment, the phase generator 380 increments the phase of the clock in a modulo manner so that the phase of the clock remains in a predetermined range of clock phases.

In an embodiment, adjusting the phase of the clock at block 1012 comprises adjusting the phase of the clock in response to each reverse timing signal detected at block 1028. In other embodiments, adjusting the phase of the clock at block 1012 comprises adjusting the phase of the clock at some other suitable frequency, such as i) every N reverse timing signals detected at block 1028, where N is a suitable integer greater than one, ii) every M clock cycles, where M is a suitable positive integer, iii) a suitable time frequency, etc.

In an embodiment, adjusting the phase of the clock at block 1012 comprises incrementing the phase of the clock by a fixed amount at a suitable frequency such as described above. In an embodiment, the phase of the clock is incremented in a modulo manner such that the phase of the clock remains in a predetermined range of sampling phases.

In an embodiment, adjusting the phase of the clock at block 1012 comprises adjusting the phase of the clock in response to detecting each of the at least some of the reverse timing signals at block 1028.

At block 1032, the logic circuitry determines timing information based on the detection of the plurality of reverse timing signals at block 1028. For example, the pulse counter 364 counts detected reverse pulses and the counter 376 measures a time period (e.g., a number of clocks) during which the detected reverse pulses were received by the communication device 300.

At block 1036, the first communication device determines the time of flight based on the timing information determined at block 1032. For example, the processor 372 determines the time of flight based on the count of detected reverse pulses (as measured by the pulse counter 364) and the time period (as measured by the counter 376) during which the detected reverse pulses were received by the communication device 800.

In an embodiment, determining the timing information at block 1036 comprises: counting, at the logic circuitry, reverse timing signals detected by the logic circuitry, and determining, at the first communication device, a time period until a number of reverse timing signals are detected; and determining the time of flight at block 1036 comprises determining the time of flight based on i) the number of reverse timing signals, and ii) the time period. In an embodiment, determining the time period comprises counting a number of cycles of a clock until the number of reverse timing signals is detected; and determining the time of flight comprises determining the time of flight based on i) the number of reverse timing signals, and ii) the number of cycles of the clock.

Although time of flight measurement techniques were described above in the context of in-vehicle communication networks for illustrative purposes, similar time of flight measurement techniques are implemented in other suitable environments such as industrial communication networks (e.g., within a process plant, manufacturing plant, etc.), sensor networks, remote sensing applications, indoor or outdoor positioning applications, etc.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory, such as a random access memory (RAM), a read only memory (ROM), a solid state memory (e.g., a Flash memory), etc. The software or firmware instructions may include machine readable instructions that, when executed by one or more processors, cause the one or more processors to perform various acts such as described above.

Embodiment 1: A transceiver associated with a first communication device, comprising: an analog-to-digital converter (ADC) configured to generate a digital receive signal based on an analog receive signal received via a communication medium; timing signal detection circuitry coupled to the ADC, the timing signal detection circuitry configured to detect a plurality of timing signals from a second communication device based on analyzing the digital receive signal; sampling phase generation circuitry coupled to the ADC, the sampling phase generation circuitry configured to adjust a sampling phase used by the ADC in connection with at least some of the timing signals so that the ADC is using different sampling phases when different ones of the timing signals are detected; timing information determination circuitry configured to determine timing information based on the detection of the plurality of timing signals when the ADC is using different sampling phases when different ones of the timing signals are detected; and a processor configured to determine the time of flight based on the timing information.

Embodiment 2: The transceiver of embodiment 1, wherein the sampling phase generation circuitry is configured to adjust the sampling phase in connection with detecting each of the at least some of the timing signals.

Embodiment 3: The transceiver of embodiment 2, wherein the sampling phase generation circuitry is configured to adjust the sampling phase in response to detecting each of the at least some of the timing signals.

Embodiment 4: The transceiver of any of embodiments 1-3, wherein the sampling phase generation circuitry is configured to adjust the sampling phase so that, for each of multiple time intervals during a time of flight measurement period, each sampling phase from a set of multiple sampling phases is used by the ADC in connection with detecting only a same number of timing signals.

Embodiment 5: The transceiver of embodiment 4, wherein the sampling phase generation circuitry is configured to adjust the sampling phase so that, for each of multiple time intervals during the time of flight measurement period, each sampling phase from the set of multiple sampling phases is used by the ADC in connection with detecting only one respective timing signal.

Embodiment 6: The transceiver of any of embodiments 1-5, wherein the sampling phase generation circuitry is configured to adjust the sampling phase so that, during a time of flight measurement period, each sampling phase from a set of multiple sampling phases is used by the ADC in connection with detecting at least X timing signals during the measurement procedure, and no sampling phase is used by the ADC in connection with detecting more than X+1 timing signals during the measurement procedure, where X is a suitable positive integer greater than one.

Embodiment 7: The transceiver of any of embodiments 1-6, wherein the sampling phase generation circuitry is configured to adjust the sampling phase at least by incrementing the sampling phase by a same amount in a modulo manner.

Embodiment 8: The transceiver of any of embodiments 1-6, wherein the sampling phase generation circuitry is configured to adjust the sampling phase at least by decrementing the sampling phase by a same amount in a modulo manner.

Embodiment 9: The transceiver of any of embodiments 1-8, wherein the sampling phase generation circuitry is configured to adjust the sampling phase according to a repeating fixed sequence of different sampling phases.

Embodiment 10: The transceiver of any of embodiments 1-6, wherein the sampling phase generation circuitry is configured to adjust the sampling phase pseudorandomly.

Embodiment 11: The transceiver of any of embodiments 1-10, wherein: the timing information determination circuitry comprises a counter configured to count timing signals detected by the timing signal detection circuitry; and the processor is configured to: determine a time period until a number of timing signals are detected, and determine the time of flight based on i) the number of timing signals, and ii) the time period.

Embodiment 12: The transceiver of embodiment 11, wherein the counter is a first counter, and wherein: the processor comprises a second counter configured to count a number of cycles of a clock until the number of timing signals is detected, the number of cycles of the clock indicating the time period; and the processor is configured to determine the time of flight based on i) the number of timing signals, and ii) the number of cycles of the clock.

Embodiment 13: The transceiver of any of embodiments 1-12, wherein the timing signals are reverse timing signals, and wherein the transceiver further comprises transmit circuitry that is configured to: generate an analog transmit signal that includes a plurality of forward timing signals; and transmit the analog transmit signal via the communication medium, wherein each forward timing signal prompts the second communication device to transmit a respective reverse timing signal.

Embodiment 14: A communication system comprising the transceiver of embodiment 13, the communication system further comprising the second communication device.

Embodiment 15: A communication system comprising the transceiver of any of embodiments 1-13 and/or the communication system of embodiment 14, the communication system further comprising the communication medium.

Embodiment 16: A method for measuring a time of flight between a first communication device and a second communication device, the method comprising: receiving, at the first communication device, an analog receive signal via a communication medium; converting, at an analog-to-digital converter (ADC) of the first communication device, the analog receive signal to a digital receive signal; detecting, at logic circuitry of the first communication device, a plurality of timing signals from the second communication device based on analyzing the digital receive signal; adjusting, at the logic circuitry, a sampling phase of the ADC in connection with at least some of the timing signals so that the ADC is using different sampling phases when different ones of the timing signals are detected; determining, at the logic circuitry, timing information based on the detection of the plurality of timing signals when the ADC is using different sampling phases when different ones of the timing signals are detected; and determining, at the first communication device, the time of flight based on the timing information.

Embodiment 17: The method of embodiment 16, wherein adjusting the sampling phase of the ADC comprises adjusting the sampling phase in connection with detecting each of the at least some of the timing signals.

Embodiment 18: The method of embodiment 17, wherein adjusting the sampling phase in connection with detecting each of the at least some of the timing signals comprises adjusting the sampling phase in response to detecting each of the at least some of the timing signals.

Embodiment 19: The method of any of embodiments 16-18, wherein adjusting the sampling phase of the ADC comprises adjusting the sampling phase so that, for each of multiple time intervals during a time of flight measurement period, each sampling phase from a set of multiple sampling phases is used by the ADC in connection with detecting only a same number of timing signals.

Embodiment 20: The method of embodiment 19, wherein adjusting the sampling phase of the ADC comprises adjusting the sampling phase so that, for each of multiple time intervals during the time of flight measurement period, each sampling phase from the set of multiple sampling phases is used by the ADC in connection with detecting only one respective timing signal.

Embodiment 21: The method of any of embodiments 16-20, wherein adjusting the sampling phase of the ADC comprises adjusting the sampling phase so that, during a time of flight measurement period, each sampling phase from a set of multiple sampling phases is used by the ADC in connection with detecting at least X timing signals during the measurement procedure, and no sampling phase is used by the ADC in connection with detecting more than X+1 timing signals during the measurement procedure, where X is a suitable positive integer greater than one.

Embodiment 22: The method of any of embodiments 16-21, wherein adjusting the sampling phase of the ADC comprises adjusting the sampling phase at least by incrementing the sampling phase by a same amount in a modulo manner.

Embodiment 23: The method of any of embodiments 16-21, wherein adjusting the sampling phase of the ADC comprises adjusting the sampling phase at least by decrementing the sampling phase by a same amount in a modulo manner.

Embodiment 24: The method of any of embodiments 16-23, wherein adjusting the sampling phase of the ADC comprises adjusting the sampling phase according to a repeating fixed sequence of different sampling phases.

Embodiment 25: The method of any of embodiments 16-21, wherein adjusting the sampling phase of the ADC comprises adjusting the sampling phase pseudorandomly.

Embodiment 26: The method of any of embodiments 16-25, wherein: determining the timing information comprises: counting, at the logic circuitry, timing signals detected by the logic circuitry, and determining, at the first communication device, a time period until a number of timing signals are detected; and determining the time of flight comprises determining the time of flight based on i) the number of timing signals, and ii) the time period.

Embodiment 27: The method of embodiment 26, wherein: determining the time period comprises counting a number of cycles of a clock until the number of timing signals is detected; and determining the time of flight comprises determining the time of flight based on i) the number of timing signals, and ii) the number of cycles of the clock.

Embodiment 28: The method of any of embodiments 16-27, wherein the timing signals are reverse timing signals, and wherein the method further comprises: generating, at the first communication device, an analog transmit signal that includes a plurality of forward timing signals; transmitting, by the first communication device, the analog transmit signal via the communication medium, wherein each forward timing signal prompts the second communication device to transmit a respective reverse timing signal.

Embodiment 29: The method of any of embodiments 16-28, further comprising: receiving, at the second communication device, the plurality of forward timing signals via the communication medium; detecting, at the second communication device, at least some forward timing signals among the plurality of forward timing signals; and in response to receiving each of the at least some forward timing signals, transmitting, by the first communication device, the respective reverse timing signal.

Embodiment 30: A transceiver associated with a first communication device, comprising: forward signal generation circuitry configured to generate a digital transmit signal that includes a plurality of forward timing signals; a digital to analog converter (DAC) configured to generate an analog transmit signal based on the digital transmit signal; clock phase adjustment circuitry configured to adjust a phase of a clock provided to the DAC in connection with at least some of the forward timing signals so that the DAC is using different phases of the clock when different ones of the forward timing signals are transmitted; driver circuitry configured to transmit the analog transmit signal via the communication medium, wherein each forward timing signal prompts the second communication device to transmit a respective reverse timing signal, and wherein the use by the DAC of the different phases of the clock when different ones of the forward timing signals are transmitted affects timing of respective transmissions of respective ones of the reverse timing signals; an analog-to-digital converter (ADC) configured to generate a digital receive signal based on an analog receive signal received via the communication medium; timing signal detection circuitry coupled to the ADC, the timing signal detection circuitry configured to detect a plurality of reverse timing signals from the second communication device based on analyzing the digital receive signal; timing information determination circuitry configured to determine timing information based on the detection of the plurality of reverse timing signals; and a processor configured to determine the time of flight based on the timing information.

Embodiment 31: The transceiver of embodiment 30, wherein the clock phase adjustment circuitry is configured to adjust the clock phase in connection with the transceiver transmitting each of the at least some of the forward timing signals.

Embodiment 32: The transceiver of embodiment 31, wherein the clock phase adjustment circuitry is configured to adjust the clock phase in response to the transceiver transmitting each of the at least some of the forward timing signals.

Embodiment 33: The transceiver of embodiment 30, wherein the clock phase adjustment circuitry is configured to adjust the clock phase in connection with the timing signal detection circuitry detecting each of at least some of the reverse timing signals.

Embodiment 34: The transceiver of embodiment 33, wherein the clock phase adjustment circuitry is configured to adjust the phase of the clock in response to the timing signal detection circuitry detecting each of at least some of the reverse timing signals.

Embodiment 35: The transceiver of any of embodiments 30-34 wherein the clock phase adjustment circuitry is configured to adjust the phase of the clock so that, for each of multiple time intervals during a time of flight measurement period, each phase from a set of multiple clock phases is used by the DAC in connection with transmitting only a same number of forward timing signals.

Embodiment 36: The transceiver of embodiment 35, wherein the clock phase adjustment circuitry is configured to adjust the phase of the clock so that, for each of multiple time intervals during the time of flight measurement period, each phase from the set of multiple clock phases is used by the DAC in connection with transmitting only one forward timing signal.

Embodiment 37: The transceiver of any of embodiments 30-36, wherein the clock phase adjustment circuitry is configured to adjust the phase of the clock so that, during a time of flight measurement period, each clock phase from a set of multiple clock phases is used by the DAC in connection with transmitting at least X forward timing signals during the measurement procedure, and no clock phase is used by the DAC in connection with transmitting more than X+1 forward timing signals during the measurement procedure, where X is a suitable positive integer greater than one.

Embodiment 38: The transceiver of any of embodiments 30-37, wherein the clock phase adjustment circuitry is configured to adjust the phase of the clock at least by incrementing the phase of the clock by a same amount in a modulo manner.

Embodiment 39: The transceiver of any of embodiments 30-37, wherein the clock phase adjustment circuitry is configured to adjust the phase of the clock at least by decrementing the phase of the clock by a same amount in a modulo manner.

Embodiment 40: The transceiver of any of embodiments 30-39, wherein the clock phase adjustment circuitry is configured to adjust the phase of the clock according to a repeating fixed sequence of different clock phases.

Embodiment 41: The transceiver of any of embodiments 30-37, wherein the clock phase adjustment circuitry is configured to adjust the phase of the clock pseudorandomly.

Embodiment 42: The transceiver of any of embodiments 30-41, wherein: the timing information determination circuitry comprises a counter configured to count reverse timing signals detected by the timing signal detection circuitry; and the processor is configured to: determine a time period until a number of reverse timing signals are detected, and determine the time of flight based on i) the number of reverse timing signals, and ii) the time period.

Embodiment 43: The transceiver of embodiment 42, wherein the counter is a first counter, and wherein: the processor comprises a second counter configured to count a number of cycles of the clock until the number of reverse timing signals is detected, the number of cycles of the clock indicating the time period; and the processor is configured to determine the time of flight based on i) the number of reverse timing signals, and ii) the number of cycles of the clock.

Embodiment 44: A communication system comprising the transceiver of any of embodiments 30-43, the communication system further comprising the second communication device.

Embodiment 45: A communication system comprising the transceiver of any of embodiments 30-43 and/or the communication system of embodiment 44, the communication system further comprising the communication medium.

Embodiment 46: A method for measuring a time of a flight between a first communication device and a second communication device, the method comprising: generating, at the first communication device, a digital transmit signal that includes a plurality of forward timing signals; generating, at a digital to analog converter (DAC) of the first communication device, an analog transmit signal based on the digital transmit signal; adjusting, at logic circuitry of the first communication device, a phase of a clock provided to the DAC in connection with at least some of the forward timing signals so that the DAC is using different phases of the clock when different ones of the forward timing signals are transmitted; transmitting, by the first communication device, the analog transmit signal via the communication medium, wherein each forward timing signal prompts the second communication device to transmit a respective reverse timing signal, and wherein the use by the DAC of the different phases of the clock when different ones of the forward timing signals are transmitted affects timing of respective transmissions of respective ones of the reverse timing signals; receiving, at the first communication device, an analog receive signal via the communication medium; converting, at an analog-to-digital converter (ADC) of the first communication device, the analog receive signal to a digital receive signal; detecting, at the logic circuitry, a plurality of reverse timing signals from the second communication device based on analyzing the digital receive signal; determining, at the logic circuitry, timing information based on the detection of the plurality of reverse timing signals; and determining, at the first communication device, the time of flight based on the timing information.

Embodiment 47: The method of embodiment 46, wherein adjusting the phase of the clock provided to the DAC comprises adjusting the phase of the clock in connection with transmitting each of the at least some of the forward timing signals.

Embodiment 48: The method of embodiment 47, wherein adjusting the phase of the clock provided to the DAC comprises adjusting the phase of the clock in response to transmitting each of the at least some of the forward timing signals.

Embodiment 49: The method of embodiment 46, wherein adjusting the phase of the clock provided to the DAC comprises adjusting the phase of the clock in connection with the detecting each of at least some of the reverse timing signals.

Embodiment 50: The method of embodiment 49, wherein adjusting the phase of the clock in connection with detecting each of at least some of the reverse timing signals comprises adjusting the phase of the clock in response detecting each of at least some of the reverse timing signals.

Embodiment 51: The method of any of embodiments 46-50, wherein adjusting the phase of the clock comprises adjusting the phase of the clock so that, for each of multiple time intervals during a time of flight measurement period, each clock phase from a set of multiple clock phases is used by the DAC in connection with transmitting only a same number of forward timing signals.

Embodiment 52: The method of embodiment 51, wherein adjusting the phase of the clock comprises adjusting the phase of the clock so that, for each of multiple time intervals during a time of flight measurement period, each clock phase from a set of multiple clock phases is used by the DAC in connection with transmitting only one forward timing signal.

Embodiment 53: The method of any of embodiments 46-52, wherein adjusting the phase of the clock comprises adjusting the phase of the clock so that, during a time of flight measurement period, each clock phase from a set of multiple clock phases is used by the DAC in connection with transmitting at least X forward timing signals during the measurement procedure, and no clock phase is used by the DAC in connection with transmitting more than X+1 forward timing signals during the measurement procedure, where X is a suitable positive integer greater than one.

Embodiment 54: The method of any of embodiments 46-53, wherein adjusting the phase of the clock comprises adjusting the phase of the clock at least by incrementing the phase of the clock by a same amount in a modulo manner.

Embodiment 55: The method of any of embodiments 46-53, wherein adjusting the phase of the clock comprises adjusting the phase of the clock decrementing the phase of the clock by a same amount in a modulo manner.

Embodiment 56: The method of any of embodiments 46-55, wherein adjusting the phase of the clock comprises adjusting the phase of the clock according to a repeating fixed sequence of different sampling phases.

Embodiment 57: The method of any of embodiments 46-53, wherein adjusting the phase of the clock comprises adjusting the phase of the clock pseudorandomly.

Embodiment 58: The method of any of embodiments 46-57, wherein: determining the timing information comprises: counting, at the logic circuitry, reverse timing signals detected by the logic circuitry, and determining, at the first communication device, a time period until a number of reverse timing signals are detected; and determining the time of flight comprises determining the time of flight based on i) the number of reverse timing signals, and ii) the time period.

Embodiment 59: The method of embodiment 58, wherein: determining the time period comprises counting a number of cycles of the clock until the number of reverse timing signals is detected; and determining the time of flight comprises determining the time of flight based on i) the number of reverse timing signals, and ii) the number of cycles of the clock.

Embodiment 60: The method of any of embodiment 46-59, further comprising: receiving, at the second communication device, the plurality of forward timing signals via the communication medium; detecting, at the second communication device, at least some forward timing signals among the plurality of forward timing signals; and in response to receiving each of the at least some forward timing signals, transmitting, by the first communication device, the respective reverse timing signal.

Embodiment 61: A first communication device comprising a transceiver configured to perform the method of any of embodiments 46-60.

Embodiment 62: A communication system comprising the first communication device of embodiment 61, the communication system further comprising the second communication device.

Embodiment 63: A communication system comprising the first communication device of embodiment 61 and/or the communication system of embodiment 62, the communication system further comprising the communication medium.

Embodiment 64: A first communication device comprising a transceiver configured to perform the method of any of embodiments 16-29.

Embodiment 65: A communication system comprising the first communication device of embodiment 64, the communication system further comprising the second communication device.

Embodiment 66: A communication system comprising the first communication device of embodiment 64 and/or the communication system of embodiment 65, the communication system further comprising the communication medium.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A transceiver associated with a first communication device, comprising:

an analog-to-digital converter (ADC) configured to generate a digital receive signal based on an analog receive signal received via a communication medium;

timing signal detection circuitry coupled to the ADC, the timing signal detection circuitry configured to detect a plurality of timing signals from a second communication device during a time of flight measurement procedure based on analyzing the digital receive signal;

sampling phase generation circuitry configured to adjust a sampling phase used by the ADC in connection with at least some of the timing signals so that the ADC is using different sampling phases when different ones of the timing signals are detected;

a switch configured to i) couple an output of the sampling phase generation circuitry to the ADC during the time of flight measurement procedure, and ii) couple a phase control output of receive circuitry to the ADC during normal operation of the transceiver;

timing information determination circuitry configured to determine timing information based on the detection of the plurality of timing signals when the ADC is using different sampling phases when different ones of the timing signals are detected; and a processor configured to determine the time of flight based on the timing information.

2. The transceiver of claim 1, wherein the sampling phase generation circuitry is configured to adjust the sampling phase in connection with detecting each of the at least some of the timing signals.

3. The transceiver of claim 2, wherein the sampling phase generation circuitry is configured to adjust the sampling phase in response to detecting each of the at least some of the timing signals.

4. The transceiver of claim 1, wherein:

the timing information determination circuitry comprises a counter configured to count timing signals detected by the timing signal detection circuitry; and the processor is configured to:

determine a time period until a number of timing signals are detected, and determine the time of flight based on i) the number of timing signals, and ii) the time period.

5. The transceiver of claim 4, wherein the counter is a first counter, and wherein:

the processor comprises a second counter configured to count a number of cycles of a clock until the number of timing signals is detected, the number of cycles of the clock indicating the time period; and the processor is configured to determine the time of flight based on i) the number of timing signals, and ii) the number of cycles of the clock.

6. The transceiver of claim 1, wherein the timing signals are reverse timing signals, and wherein the transceiver further comprises transmit circuitry that is configured to:

generate an analog transmit signal that includes a plurality of forward timing signals; and transmit the analog transmit signal via the communication medium, wherein each forward timing signal prompts the second communication device to transmit a respective reverse timing signal.

7. A method for measuring a time of flight between a first communication device and a second communication device, the method comprising:

receiving, at the first communication device, an analog receive signal via a communication medium;

converting, at an analog-to-digital converter (ADC) of the first communication device, the analog receive signal to a digital receive signal;

detecting, at logic circuitry of the first communication device, a plurality of timing signals from the second communication device during a time of flight measurement procedure based on analyzing the digital receive signal;

coupling, with a switch, an output of a phase generator to the ADC during the time of flight measurement procedure;

coupling, with the switch, a phase control output of a receiver to the ADC during normal operation;

adjusting, with the phase generator, a sampling phase of the ADC in connection with at least some of the timing signals so that the ADC is using different sampling phases when different ones of the timing signals are detected during the time of flight measurement procedure;

determining, at the logic circuitry, timing information based on the detection of the plurality of timing signals when the ADC is using different sampling phases when different ones of the timing signals are detected; and determining, at the first communication device, the time of flight based on the timing information.

8. The method of claim 7, wherein adjusting the sampling phase of the ADC comprises adjusting the sampling phase in connection with detecting each of the at least some of the timing signals.

9. The method of claim 8, wherein adjusting the sampling phase in connection with detecting each of the at least some of the timing signals comprises adjusting the sampling phase in response to detecting each of the at least some of the timing signals.

10. The method of claim 7, wherein:

determining the timing information comprises:

counting, at the logic circuitry, timing signals detected by the logic circuitry, and determining, at the first communication device, a time period until a number of timing signals are detected; and determining the time of flight comprises determining the time of flight based on i) the number of timing signals, and ii) the time period.

11. The method of claim 10, wherein:

determining the time period comprises counting a number of cycles of a clock until the number of timing signals is detected; and determining the time of flight comprises determining the time of flight based on i) the number of timing signals, and ii) the number of cycles of the clock.

12. The method of claim 7, wherein the timing signals are reverse timing signals, and wherein the method further comprises:

generating, at the first communication device, an analog transmit signal that includes a plurality of forward timing signals;

transmitting, by the first communication device, the analog transmit signal via the communication medium, wherein each forward timing signal prompts the second communication device to transmit a respective reverse timing signal.

13. A transceiver associated with a first communication device, comprising:

forward signal generation circuitry configured to generate a digital transmit signal that includes a plurality of forward timing signals;

a digital to analog converter (DAC) configured to generate an analog transmit signal based on the digital transmit signal;

clock phase adjustment circuitry configured to adjust a phase of a clock provided to the DAC in connection with at least some of the forward timing signals so that the DAC is using different phases of the clock when different ones of the forward timing signals are transmitted;

driver circuitry configured to transmit the analog transmit signal via the communication medium, wherein each forward timing signal prompts the second communication device to transmit a respective reverse timing signal, and wherein the use by the DAC of the different phases of the clock when different ones of the forward timing signals are transmitted affects timing of respective transmissions of respective ones of the reverse timing signals;

an analog-to-digital converter (ADC) configured to generate a digital receive signal based on an analog receive signal received via the communication medium;

timing signal detection circuitry coupled to the ADC, the timing signal detection circuitry configured to detect a plurality of reverse timing signals from the second communication device based on analyzing the digital receive signal;

timing information determination circuitry configured to determine timing information based on the detection of the plurality of reverse timing signals; and a processor configured to determine the time of flight based on the timing information.

14. The transceiver of claim 13, wherein the clock phase adjustment circuitry is configured to adjust the clock phase in connection with the transceiver transmitting each of the at least some of the forward timing signals.

15. The transceiver of claim 14, wherein the clock phase adjustment circuitry is configured to adjust the clock phase in response to the transceiver transmitting each of the at least some of the forward timing signals.

16. The transceiver of claim 13, wherein the clock phase adjustment circuitry is configured to adjust the clock phase in connection with the timing signal detection circuitry detecting each of at least some of the reverse timing signals.

17. The transceiver of claim 16, wherein the clock phase adjustment circuitry is configured to adjust the phase of the clock in response to the timing signal detection circuitry detecting each of at least some of the reverse timing signals.

18. The transceiver of claim 13, wherein:

the timing information determination circuitry comprises a counter configured to count reverse timing signals detected by the timing signal detection circuitry; and the processor is configured to:

determine a time period until a number of reverse timing signals are detected, and determine the time of flight based on i) the number of reverse timing signals, and ii) the time period.

19. The transceiver of claim 18, wherein the counter is a first counter, and wherein:

the processor comprises a second counter configured to count a number of cycles of the clock until the number of reverse timing signals is detected, the number of cycles of the clock indicating the time period; and the processor is configured to determine the time of flight based on i) the number of reverse timing signals, and ii) the number of cycles of the clock.

20. A method for measuring a time of a flight between a first communication device and a second communication device, the method comprising:

generating, at the first communication device, a digital transmit signal that includes a plurality of forward timing signals;

generating, at a digital to analog converter (DAC) of the first communication device, an analog transmit signal based on the digital transmit signal;

adjusting, at logic circuitry of the first communication device, a phase of a clock provided to the DAC in connection with at least some of the forward timing signals so that the DAC is using different phases of the clock when different ones of the forward timing signals are transmitted;

transmitting, by the first communication device, the analog transmit signal via the communication medium, wherein each forward timing signal prompts the second communication device to transmit a respective reverse timing signal, and wherein the use by the DAC of the different phases of the clock when different ones of the forward timing signals are transmitted affects timing of respective transmissions of respective ones of the reverse timing signals;

receiving, at the first communication device, an analog receive signal via the communication medium;

converting, at an analog-to-digital converter (ADC) of the first communication device, the analog receive signal to a digital receive signal;

detecting, at the logic circuitry, a plurality of reverse timing signals from the second communication device based on analyzing the digital receive signal;

determining, at the logic circuitry, timing information based on the detection of the plurality of reverse timing signals; and determining, at the first communication device, the time of flight based on the timing information.

21. The method of claim 20, wherein adjusting the phase of the clock provided to the DAC comprises adjusting the phase of the clock in connection with transmitting each of the at least some of the forward timing signals.

22. The method of claim 21, wherein adjusting the phase of the clock provided to the DAC comprises adjusting the phase of the clock in response to transmitting each of the at least some of the forward timing signals.

23. The method of claim 20, wherein:

determining the timing information comprises:

counting, at the logic circuitry, reverse timing signals detected by the logic circuitry, and determining, at the first communication device, a time period until a number of reverse timing signals are detected; and determining the time of flight comprises determining the time of flight based on i) the number of reverse timing signals, and ii) the time period.

24. The method of claim 23, wherein:

determining the time period comprises counting a number of cycles of the clock until the number of reverse timing signals is detected; and determining the time of flight comprises determining the time of flight based on i) the number of reverse timing signals, and ii) the number of cycles of the clock.

* * * * *